(12) United States Patent
Falik et al.

(10) Patent No.: US 7,089,339 B2
(45) Date of Patent: Aug. 8, 2006

(54) SHARING OF FUNCTIONS BETWEEN AN EMBEDDED CONTROLLER AND A HOST PROCESSOR

(75) Inventors: Ohad Falik, Kfar Saba (IL); Yehezkel Friedman, Ramat Hasharon (IL); Victor Flachs, Rishon-Le-Zion (IL); Yuval Kirschner, Ra'anana (IL)

(73) Assignee: National Semiconductor Corporation, Santa Clara, CA (US)

( * ) Notice: Subject to any disclaimer, the term of this patent is extended or adjusted under 35 U.S.C. 154(b) by 861 days.

(21) Appl. No.: 09/810,746

(22) Filed: Mar. 16, 2001

(65) Prior Publication Data

US 2002/0133655 A1  Sep. 19, 2002

(51) Int. Cl.
*G06F 12/00* (2006.01)

(52) U.S. Cl. ............. 710/200; 710/240; 710/107; 710/108

(58) Field of Classification Search ......... 710/240, 710/300, 107–108, 200; 718/102; 714/1–57
See application file for complete search history.

(56) References Cited

U.S. PATENT DOCUMENTS

| | | | | |
|---|---|---|---|---|
| 5,214,778 | A * | 5/1993 | Glider et al. ............... 714/2 |
| 5,276,886 | A * | 1/1994 | Dror .......................... 710/240 |
| 5,339,443 | A * | 8/1994 | Lockwood .................. 710/244 |
| 5,592,673 | A * | 1/1997 | Kurabayashi et al. ....... 710/200 |
| 5,603,051 | A * | 2/1997 | Ezzet ............................ 710/2 |
| 5,794,054 | A * | 8/1998 | Le et al. ..................... 710/240 |
| 5,909,540 | A * | 6/1999 | Carter et al. .................. 714/4 |
| 5,933,616 | A * | 8/1999 | Pecone et al. .............. 710/240 |
| 5,966,547 | A * | 10/1999 | Hagan et al. ................. 710/57 |
| 6,094,700 | A * | 7/2000 | Deschepper et al. ........ 710/313 |
| 6,131,131 | A * | 10/2000 | Bassman et al. ............. 710/15 |
| 6,157,979 | A * | 12/2000 | Barnett ...................... 710/267 |
| 6,260,098 | B1 * | 7/2001 | Ku ............................. 710/313 |
| 6,343,338 | B1 * | 1/2002 | Reneris ...................... 710/200 |
| 6,353,898 | B1 * | 3/2002 | Wipfel et al. ................ 714/48 |
| 6,446,153 | B1 * | 9/2002 | Cooper et al. ............. 710/260 |
| 6,654,833 | B1 * | 11/2003 | LaBerge ..................... 710/107 |
| 6,684,346 | B1 * | 1/2004 | Tu et al. ....................... 714/11 |
| 2002/0129184 | A1 * | 9/2002 | Watanabe ................... 710/240 |
| 2002/0166018 | A1 * | 11/2002 | Kim ........................... 710/260 |
| 2003/0051190 | A1 * | 3/2003 | Marisetty et al. ............ 714/11 |
| 2003/0196142 | A1 * | 10/2003 | Brooks ......................... 714/28 |

OTHER PUBLICATIONS

"Sun Microsystems Unveils New SPARCengine COMPACTPCI Family of Embedded-Board Computers," Feb. 18, 1998, Sun Microsystems Press Release.*

(Continued)

*Primary Examiner*—Rehana Perveen
*Assistant Examiner*—Kim T. Huynh

(57) ABSTRACT

An improved system is described for allowing an embedded controller and a host processor to share access to modules in a computer system. The shared access system of the present invention enables exclusive, one-at-a-time access by a processor to a module and concurrent access by more than one processor to a module. An internal bus with two power sources is used to allow continued access by one of the processors when one of the two power sources is not providing power. Asynchronous clocking is provided to allow increased throughput to modules. An example of a protocol that allows an embedded controller to access more than one module is also described.

20 Claims, 27 Drawing Sheets

OTHER PUBLICATIONS

"IEEE 100: The Authoritative Dictionary of IEEE Standards Terms, Seventh Edition," 2000, IEEE, p. 378.*

Lortz, Victor B., et al., "Semaphore Queue Priority Assignment for Real-Time Multiprocessor Synchronization," Oct. 10, 1995, IEEE Transactions on Software Engineering, vol. 21, Issue 10, p. 834-844.*

Shing, Honda, et al., "Resource Binding—A Universal Approach to Parallel Processing," Nov. 12-16, 1990, IEEE Proceedings o Supercomputing, p. 574-583.*

Ramesh, Tirumale, et al., "Bus Arbitration in an Embedded Processor-Shared Multiprocessor System," Aug. 16-18, 1993, IEEE Proceedings of the 36th Midwest Symposium on Circuits and Systems, vol. 1, p. 320-322.*

* cited by examiner

| Bit | 7 | 6 | 5 | 4 | 3 | 2 | 1 | 0 |
|---|---|---|---|---|---|---|---|---|
| Name | \multicolumn{7}{c|}{SLAVEAD} | ACBRW |

FIG. 25A

| Bit | 7 | 6 | 5 | 4 | 3 | 2 | 1 | 0 |
|---|---|---|---|---|---|---|---|---|
| Name | INEX=0 | RDWR | LOGDEV | | | | | |

| Bit | 7 | 6 | 5 | 4 | 3 | 2 | 1 | 0 |
|---|---|---|---|---|---|---|---|---|
| Name | INEX=1 | RDWR | Reserved | XBCSN | | XA26-XA24 | | |

FIG. 25B

| 7 | 6 | 5 | 4 | 3 | 2 | 1 | 0 |
|---|---|---|---|---|---|---|---|

Offset address byte type

FIG. 25C

| 7 | 6 | 5 | 4 | 3 | 2 | 1 | 0 |
|---|---|---|---|---|---|---|---|

Data byte type

FIG. 25D

| 7 | 6 | 5 | 4 | 3 | 2 | 1 | 0 |
|---|---|---|---|---|---|---|---|

PEC byte type

FIG. 25E

S = Start condition    A = ACK by master
P = Stop condition     N = NACK by master
R = Restart cond.      A = ACK by slave

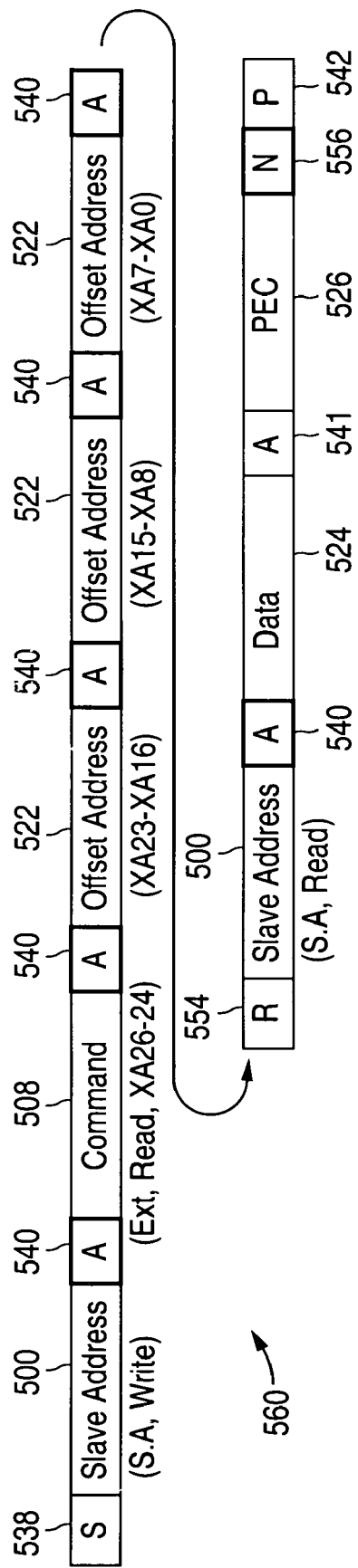
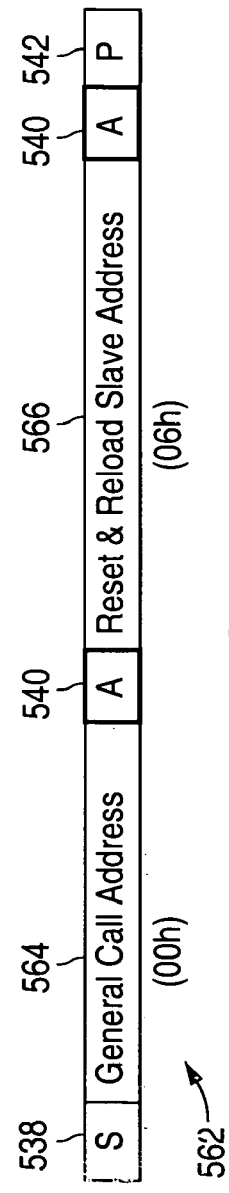
FIG. 26D
FIG. 26E

US 7,089,339 B2

SHARING OF FUNCTIONS BETWEEN AN EMBEDDED CONTROLLER AND A HOST PROCESSOR

BACKGROUND OF THE INVENTION

The field of the invention relates to systems and methods for shared access between an embedded controller and a host processor to modules including but not limited to input/output modules. Embedded controllers are designed for specific tasks and/or to control a particular system, as part of a larger device or system. Embedded controllers perform functions such as system monitoring and control, verification of correct system operation (health monitoring), and/or troubleshooting and error recovery, handled when the host processor is off or malfunctioning or as a background fail safe operation when the host is active. As embedded controllers and host processors increasingly function together in controlling a computer environment, sharing access between embedded controllers and host processors to different elements of the computer environment becomes increasingly important.

There follows a brief description of prior art input/output modules. Input/output ("I/O") modules allow the connection of peripheral devices to the computer (i.e., host processor and or embedded controller), typically through a bus interface. I/O modules commonly include one or more of the following: keyboard and mouse controller, floppy disk controller, serial ports, parallel ports, infrared ports, and general purpose input/output ports. It should be understood that the above list is not exhaustive and that I/O modules can include other modules which allow the connection of peripheral devices. The I/O modules are commonly but not necessarily integrated into one chip (i.e., an "input/output chip") on the motherboard of a computer. However, other connection configurations of certain or all of the modules, for example, through a bus extension, are also possible. It should be evident that input/output chips include other modules in addition to input/output modules to improve the functionality of the chip including but not limited to: clock modules, power management modules, configuration, bus extensions, interfaces, reset circuitry, etc.

A representative prior art I/O chip 10 PC87364 "128-Pin LPC Super I/O with Extended Wake-Up and Protection Support" of National Semiconductor Corporation of Santa Clara, Calif., is shown in FIG. 1. Data sheets for chip 10 are available on the World Wide Web at www.national.com. Modules typical to input/output chips which are included in chip 10 are a serial port 12, an infrared port 14, a plurality of general purpose I/O ports (GPIO ports) 16, a floppy disk controller 18, a parallel port 20, a configuration module 24, a keyboard and mouse controller 30, an access bus interface 36 and a system wake-up control (SWC) 38. Other components particular to chip 10 include an interrupt serializer 28, a fan speed control and monitor 32, and a watchdog timer 34. Power sources $V_{DD}$ (main) 40, $V_{SB}$ (standby) 44, and $V_{BAT}$ (battery backup) 42 supply power to chip 10. Part of GPIO ports 16, and optionally part of SWC 38 are powered by $V_{SB}$ 44. $V_{BAT}$ 42 provides backup (using a battery) to critical events and configurations in SWC 38 and to other parts of chip 10, while $V_{SB}$ is off. All other components of chip 10 are powered by $V_{DD}$ 40. A host processor 26 is connected to an internal bus 54 through a low pin count (LPC) interface 22, allowing host processor 26 to access modules 12 to 22 and modules 28 to 38, and configuration 24. Modules 12 to 22 and modules 28 to 38 are collectively noted as a typical module 45 in FIG. 2.

Although the description below for FIG. 2 and FIG. 3 refer to components of chip 10 for illustrative purposes, the schemes shown in FIG. 2 and FIG. 3 are common to many prior art chips.

Prior art FIG. 2 shows a system 46 whereby host processor 26 accesses typical module 45 through an LPC interface 22 that converts an LPC bus to a data bus 56, an address bus 55, and a control bus 53. Typical module 45 is enabled based on the value of module enable bits 52 within registers in configuration 24.

To access particular module 45, host processor 26 sends the address 55 of a specific register 47 within particular module 45. Address 55 includes high bits which are compared by a comparator 49 with the base addresses+size 48 for each module 45 that are stored (i.e., configured) in configuration 24. The size provides a boundary on the highest possible address for each module 45, and the base address provides the lower boundary of addresses for each module 45. If no configuring process takes place, the base address of typical module 45 is retained at default value. As a result of the comparison, a module select (or as sometimes called "chip select") 50 for particular module 45 is generated and placed on internal bus 54. Control signals 53 are converted to internal bus control 51 (i.e., in the format required by internal bus 54). In addition, address 55 includes lower bits which relate to the offset address. The offset address is specified with respect to the base address of particular module 45, and allows the identification of specific register 47 within particular module 45. The data 56 can then be read or written to specific register 47.

In certain modules 45, the approach to specific register 47 within particular module 45 is via a module-specific index register 59 (shown as optional in FIG. 2 using a broken line), and a module-specific data register 61 (also shown as optional in FIG. 2 using a broken line). Index register 59 and data register 61 are located at different offset addresses from the base address of module 45. For example, index register 59 can be located at offset zero ("0") and data register 61 at offset one ("1"). In this case, two transactions are necessary to read or write. First, address 55 of index register 59 is sent along with data 56 to be written to index register 59 (in this case the data 56 is the index value of specific register 47). Next, address 55 of data register 61 is sent and data 56 can then be written to or read from specific register 47 via data register 61 (as is well known in the art, data register 61 is a "dummy register" and contains a duplicate of the contents of specific register 47). Note that if the index is already set to the correct value, there is no need to re-write the address prior to the successive data access operation.

Prior art FIG. 3 shows the mechanism for setting the configuration of typical module 45. Device configuration 24, includes a configuration index register 73, a configuration data register 74, global configuration registers 64 and a logical device number (LDN) configuration register 66. Index register 73 is located at address 2Eh or 4Eh of input/output address space 58, and data register 74 is located at address 2Fh or 4Fh of input/output space 60. Configuration registers related to typical module 45 include logical device specific configuration registers 70 organized in banks 69. Therefore, to access logical device specific configuration registers 70, two-dimensional indexing is required. In order for host processor 26 to access one of logical device specific configuration registers 70 relating to one of modules 45, one of banks 69 (i.e., logical devices 45) is selected by first specifying the index of LDN configuration register 66 in configuration index register 73, and then specifying the logical device number of one of modules 45 in configuration data register 74. Host processor 26 next chooses a logical device specific configuration register 71 by writing the index of configuration register 71 in configuration index register 73. The configuration data is then written to register 71 through configuration data register 74.

Note that in the above description of chip 10, there is no interface for an embedded controller and specifically no means for an embedded controller to access typical module 45 and configuration 24.

Prior art FIG. 4 shows a schematic 80 of the host bus interface of PC87570 (chip 82) of National Semiconductor Corporation of Santa Clara, Calif. Data sheets for chip 82, a keyboard and power management controller are available on the World Wide Web at www.national.com. Chip 82 includes an embedded controller core 84, which accesses a host bus interface 86 through a core bus 85 to ISA bridge 87. An external flash memory 81 is accessible by core 84 through a core bus 85 and a bus interface unit 89. When a host processor 98 asserts certain signals, host bus interface. 86 identifies the signals and requests control over core bus 85 using a core bus master mechanism (not shown in FIG. 4), thereby allowing host processor 98 to access flash memory 81 through host bus interface 86, core bus 85 and bus interface unit 89. The host transaction is extended using a 'not ready' indication (not shown in FIG. 4) until the transaction is completed.

After reset, core 84 in chip 82 needs to finish various system configurations and therefore blocks access of host processor 98 to shared memory 81. After core 84 has completed various system configurations, core 84 removes the access block and enables host processor 98 to access shared memory 81. Until the configurations are complete, if host processor 98 attempts access to shared memory 81, host processor 98 is indicated to wait using a 'not-ready' indication, or optionally a signal is sent to reset host processor 98. Note that no indication is given to core 84 if host processor 98 attempts access to shared memory 81 when shared memory 81 is blocked. Note also that the blocking of shared memory 81 occurs only during an initialization process.

A core and host arbitrator 88 arbitrates between host processor 98 and core 84 the access to the shared a Real Time Clock (RTC) module 100 on a resident device bus 91. A host access 96 to RTC module 100 and a core access 94 to RTC module 100 are illustrated by broken lines having an arrow at each end. RTC module 100 includes an index register RTCCA 102 and a data register RTCCD 104, which are used to access all internal registers 103 of all RTC banks 105. Index register 102 and data register 104 are located at consecutive addresses. Index register 102 holds the index of particular RTC register 103 that is read or written to through data register 104. Bank 105 is selected using the CRA register 101. In chip 82, both host processor 98 and core 84 can access registers 102 and 104.

Assuming that bank 105 has already been indicated through CRA register 101, host processor 98 accesses particular internal register 103, by sending the host address of index register 102 on a host bus 92 along with data. The address is translated into a chip select and address offset as explained with reference to FIG. 2. The data (which in this case is the index value of internal register 103) is then written to index register 102. Host processor 98 then sends the host address of data register 104. The data of particular register 103 can then be written or read through data register 104. Similarly, core 84 can access particular internal register 103 through index register 102 and data register 104. Core 84 sends the core address of index register 102 on core bus 85 along with the data. The data (in this case the index value of internal register 103) is then written to index register 102. Core 84 then sends the core address of data register 104. The data of register 103, which corresponds to the index value, can then be written or read through data register 104.

Note that although the core address sent by core 84 and the host address sent by host processor 98 may not be identical, two decoders (not shown in FIG. 4), one for core 84 and one for host processor 98 decode the two addresses to the same register.

A register CTS1 90 is accessed by core 84 and used to control host bus interface 86 with respect to RTC module 100 access.

CTS1 90 is shown in more detail in prior art FIG. 5. A lock RTC host access (LKRTCHA) 106 arbitrates the usage of RTC module 100 between host processor 98 and core 84. When LKRTCHA 106 is reset to zero ("0"), core 84 can not access registers 102 and 104 (and therefore can not access all internal registers 103), and only host 98 can access registers 102 and 104. When LKRTCHA 106 is set to one ("1"), host processor 98 can not access registers 102 and 104 (and therefore can not access all internal registers 103), and only core 84 can access registers 102 and 104. An RTC lock violation (RTCLV) 108 is set as an indication to core 84 if host processor 98 attempts to access RTC module 100 when LKRTCHA 106 is set to one ("1"). In parallel, the host access is completed in the following way: read access return a fixed value of zero and write access is completed ignoring the data written.

Other components of CTS1 90 will be mentioned only in passing. An RTC master reset (RTCMR) 107 when set to one ("1"), allows core 84 to access RTC protected memory. A host power on (HPWRON) 109 allows core 84 to monitor host power on, and a host master reset active (HMRA) 110 enables core 84 to monitor the status of a host master reset.

It should be noted that the RTC sharing scheme of chip 82 provides only an access block option, i.e., either core 84 or host processor 98 have exclusive control of RTC module 100. Chip 82 therefore allows shared access (exclusively one at a time) of host processor 98 and core 84 to RTC module 100. In order to prevent conflicts, host processor 98 and core 84 can not access RTC module 100 concurrently.

An example of a possible conflict that could occur if concurrent access were allowed to RTC module 100 (i.e., if access by one of core 84 or host processor 98 were not blocked) is the following scenario: Recall from the discussion with reference to FIG. 2 that (assuming bank 105 has already been selected) two additional transactions are necessary for either core 84 or host processor 98 to read to or write from internal register 103 because of the index/data registers. In a first host transaction, host processor 98 writes the index of internal register 103 to index register 102. Then, in a first controller transaction, embedded controller core 84 writes the index of another internal register 99 to index register 102. Finally, in a second host transaction, host processor 98 sends or receives data supposedly for internal register 103 which is instead written to or read from register 99 (because the index value of register 99 is in index register 102).

In addition, shared access is only implemented for one specific pre-defined input/output module (i.e., RTC 100 of chip 82) on resident device bus 91, even though chip 82 also includes other modules such as a keyboard controller, and a power management device. Also, there is no indication to host processor 98 when host processor 98 attempts to access RTC module 100 while LKRTCHA 106 is set to one ("1").

Only one indication is provided (RTC lock violation RTCLV 108) and only to embedded controller core 84.

Chip 82 is powered by a single voltage source ($V_{CC}$). In addition, there is a battery backup for RTC module 100.

FIG. 6 shows another example of prior art sharing of input/output functions between an embedded controller 113 and a host processor 114. Chip 115 FDC37N972, is a product of Standard Microsystems Corporation (SMsC) headquartered at Hauppauge, N.Y. Data sheets of chip 115 can be found on the World Wide Web at www.smsc.com. Embedded controller 113 can disconnect access of host processor 114 to parallel port connector 116 by writing a bit 112 in a parallel port controls register of controller 113. A multiplexer 117 controlled by bit 112 selects either host processor 114 or embedded controller 113 for access to parallel port connector 116. Embedded controller 113 has no access to any other input/output functions. Chip 115 is powered by one of two voltage sources (VCC1, VCC2). Chip 115 includes two separate buses, one for host processor 114, and the other for controller 113, with each bus powered by a different voltage source.

W83627HF is an input/output chip developed by Winbond Electronics Corporation of Taiwan whose World Wide Web site www.winbond.com includes data sheets for W83627HF. In addition to the traditional I/O functions, W83627HF has integrated into it a hardware monitor 119. Refer to FIG. 7 which shows the access scheme to hardware monitor 119. The functions of hardware monitor 119 are controlled by a host processor 118 through an LPC bus 126. An embedded controller core 120 also controls hardware monitor 119 through I2C bus 122.

FIG. 8 shows the access scheme through LPC bus 126. A hardware monitor index register 128 includes a bit 130 which is set to one ("1") by a write to index register 128. Bit 130 is cleared by a read or write from/to a data register 129. Bit 130 can be seen from both LPC bus 126 and I2C bus 122. Bit 130 should be checked prior to beginning an LPC bus 126 or I2C bus 122 transaction (see FIG. 7). For the scheme to work, either host processor 118 or embedded controller core 120 must perform the following sequence prior to any data access (read or write), without exception even for successive data accesses (i.e., the index even for successive data accesses must be rewritten each time). A read or write starts by reading index register 128 and checking that bit 130 is clear. If bit 130 is not clear, the operation is repeated until bit 130 is clear. Once bit 130 is found to be clear, the desired index is written to index register 128. Index register 128 and bit 130 are both read to check that the address is right and bit 130 is set. If bit 130 is not set, the process starts at the beginning. If bit 130 is set, one data item may be read or written from/to data register 129. Even using the above scheme, the mechanism will fail if both host processor 118 and embedded controller core 120 try to read and/or write locations with the same index value.

There is a need in the art for systems and methods for allowing shared access by an embedded controller and a host processor to modules both internal to chips and off bus extensions, including but not limited to modules within input/output ("I/O") chips or accessible through bus extensions off input/output chips. There is also a need in the art for systems and methods for allowing shared access by an embedded controller and a host processor to more than one module. There is also a need in the art for systems and methods for allowing concurrent access to certain modules by an embedded controller and a host processor. There is also a need in the art for a protocol which allows access by an embedded controller to more than one module.

SUMMARY OF THE INVENTION

According to the present invention, there is provided a system for allowing shared access by at least two processors including an embedded controller and a host processor to at least two modules comprising: at least two modules; and a transaction control; wherein the embedded controller is capable of providing an indication of which of the at least two modules to access to the transaction control; and the host processor is capable of providing an indication of which of the at least two modules to access to the transaction control.

According to the present invention, there is further provided a system for allowing shared access by at least two processors including an embedded controller and a host processor to at least one module, comprising: a main power supply; an alternative power supply; at least one module, wherein at least part of the at least one module is powered by the alternative power supply; one internal bus connected to both at least part of the at least one module which is powered by the alternative power supply and to at least part of the at least one module which is powered by the main power supply; and at least one processor interface powered by the alternative power supply; wherein at least one of the at least two processors is capable of accessing through one bus at least part of the at least one module which is powered by the alternative power supply, even when the main power supply is off.

According to the present invention, there is still further provided a system for allowing shared access by at least two processors including an embedded controller and a host processor to at least one module, comprising: at least one module; at least one access block bit controlled by one of the at least two processors for blocking access by another of the at least two processors to the at least one module; at least one access block violation flag bit capable of providing an indication to one of the at least two processors if another processor attempts access to the at least one module whose access has been blocked; and circuitry for providing to another of the at least two processors an indication that the at least one access block bit is set to block access.

According to the present invention, there is still further provided a system for allowing shared access to at least one module by at least two processors including an embedded controller and a host processor, comprising: at least one module; and at least one access block bit controlled by one of the at least two processors, wherein the at least one access block bit is capable of blocking access to the at least one module by another of the at least two processors and is capable of enabling the at least one module.

According to the present invention, there is still further provided a system for allowing concurrent access to at least one module by at least two processors including an embedded controller and a host processor, comprising: at least one module; and access control circuitry included in the at least one module wherein the access control circuitry is capable of regulating access within the at least one module by the at least two processors, thereby allowing concurrent access.

According to the present invention, there is still further provided a method for allowing concurrent access to at least one module by at least two processors including an embedded controller and a host processor; comprising the steps of: receiving a transaction originating from one of the at least two processors; receiving an indication of which of the at least two processors originated the transaction; and processing the transaction within the at least one module based on the indication.

According to the present invention, there is still further provided a method for allowing shared access to at least one module by at least two processors including an embedded controller and a host processor, comprising the steps of: blocking the access of at least one processor to the at least one module; indicating to the at least one blocked processor that the at least one module is blocked; and indicating to a processor which has blocked access to the at least one module if the at least one blocked processor has attempted access.

According to the present invention, there is still further provided a method for allowing shared access to at least one module by at least two processors including an embedded controller and a host processor comprising the steps of: blocking access by at least one processor to the at least one module; and enabling the at least one module, as a result of the blocking step.

According to the present invention there is still further provided a method for allowing shared access to at least two modules by at least two processors including an embedded controller and a host processor, comprising the steps of: receiving an indication from each of the at least two processors of a module from among the at least two modules to access; arbitrating between the at least two processors in favor of one of the at least two processors; and accessing the module indicated by one of the at least two processors.

According to the present invention, there is still further provided a method for allowing an embedded controller to access at least two modules affiliated with a device, comprising the steps of: indicating the device; indicating an access direction (read/write); indicating one of the at least two modules for accessing; indicating a location for accessing, within the indicated one of the at least two modules; and transferring data between the indicated location and the embedded controller.

According to the present invention, there is still further provided a method for preventing access by any of at least two processors including an embedded controller and a host processor to at least part of at least one module powered by a main power supply, when the main power supply is off, comprising the steps of: determining that the main power supply is off; indicating that the main power supply is off; and preventing access to the at least part of at least one module powered by the main power supply.

According to the present invention, there is still further provided a system for increasing throughput to at least one module whose access is shared by at least two processors including an embedded controller and a host processor, comprising: at least one module that uses a clock when processing a transaction which differs based on which of the at least two processors originated the transaction.

According to the present invention there is still further provided a method for increasing throughput to at least one module whose access is shared by at least two processors including an embedded controller and a host processor, comprising the steps of: receiving a transaction from one of the at least two processors; and processing the transaction by the at least one module using a different clock depending on which of the at least two processors originated the transaction.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least on operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent documents. Those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 25A illustrates a slave address byte type according to an embodiment of the present invention;

FIG. 25B illustrates two examples of command byte types according to an embodiment of the present invention;

FIG. 25C illustrates an offset address byte type according to an embodiment of the present invention;

FIG. 25D illustrates a data byte type according to an embodiment of the present invention;

FIG. 25E illustrates a PEC byte type according to an embodiment of the present invention;

FIG. 26D shows an external read transaction according to an embodiment of the present invention;

FIG. 26E shows a reset slave transaction according to an embodiment of the present invention;

DETAILED DESCRIPTION OF THE INVENTION

FIGS. 1 through 29 and the various embodiments used to describe the principles of the present invention in this patent document are by way of illustration only and should not be construed in any way to limit the scope of the invention. Those skilled in the art will recognize that the various embodiments used to describe the present invention may easily be modified for use in other types of electronic equipment.

One advantageous embodiment of the present invention relates to systems and methods which allow shared access between an embedded controller and a host processor to modules within a chip or via an extension bus, with a particular non-limiting application being input/output ("I/O") chips and their bus extensions to memory and/or other input/output devices. Specifically, in one advantageous embodiment, the invention can be used to allow an embedded controller and a host processor to share control in a computer environment. Modules can be understood in the general sense of self-contained parts of a chip, or self-contained external components. The principles and operation of the shared access systems and methods according to an advantageous embodiment may be better understood with reference to the drawings and the accompanying description.

For ease of understanding, a particular application (i.e., input/output chips) is described below. Therefore throughout the description, reference will be made to shared access to modules within input/output chips or accessible through bus extensions off input/output chips. It should be evident, however, that the input/output chip application is described as a non-limiting example and that the systems and methods for shared access described below can equally be applied to chips with other (non input/output) functions and/or their extensions.

Figure 9:
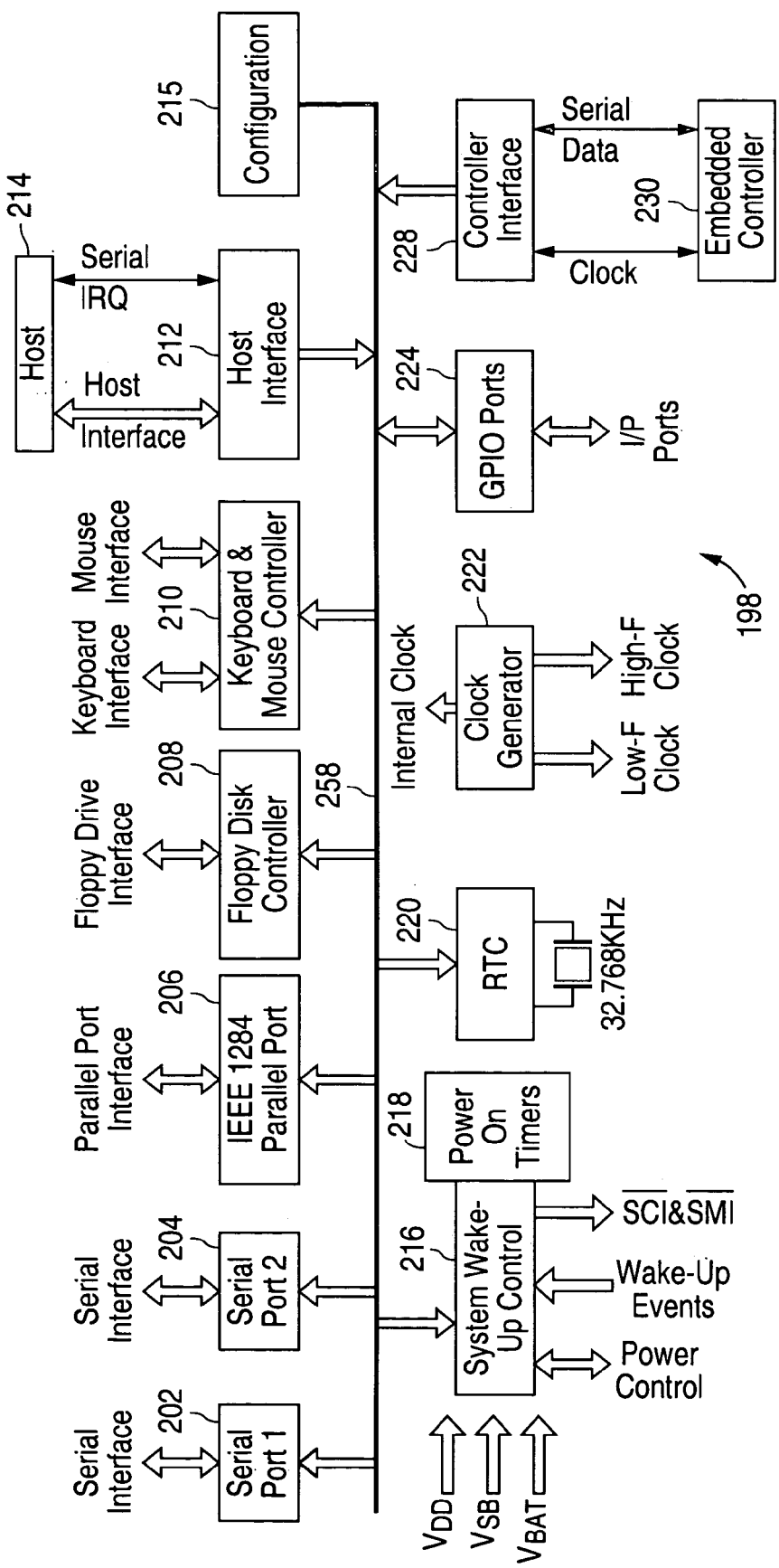
FIG. 9 is a block diagram of a chip according to an embodiment of the present invention.

Referring now to the drawings, FIG. 9 illustrates an advantageous embodiment of the present invention, for allowing shared access to modules internal to chip 198.

Chip 198 includes serial ports 202 and 204, a parallel port 206, a floppy disk controller 208, a keyboard and mouse controller 210, a host interface bus 212 (for interfacing a host processor 214, as a non-limiting example the X86 processor in an IBM PC compatible computer), a device configuration module 215, a system wake up control 216 with power on timers 218, a Real Time Clock (RTC) 220, a clock generator 222, general purpose I/O (GPIO) ports 224, and an embedded controller bus interface 228 (interfacing an embedded controller 230).

Embedded controller bus interface 228 in certain embodiments is based on the ACCESS.bus interface (defined by the ACCESS.bus Specification Rev 3.0 September 1995), on the SMBus® (defined by SMBus® Specification (Rev 1.1 Dec. 11, 1998) interface for the SMBus®), on any other suitable serial bus interface for any suitable serial bus (such as the I2C bus), or on any other suitable parallel bus interface for any suitable parallel bus. Host bus interface 212, in certain embodiments is a low pin count (LPC) bus interface based on Intel's LPC Interface Specification, Revision 1.0, Sep. 2, 1997, an ISA bus, a PCI bus, or any other host interface for any other host bus. It should be evident that controller bus 229 (FIG. 10) and host bus 213 (FIG. 10) could instead interface to chip 198 through one interface provided arbitration takes place outside of chip 198. Configuration 215 is in one embodiment a subset or a superset of the standard plug and play registers defined by Plug and Play ISA Specification, Revision 1.0a by Intel and Microsoft®, and in other embodiments is any other suitable configuration.

Chip 198 is shown with numerous legacy modules (serial ports 202 and 204, parallel port 206, floppy disk controller 208, keyboard and mouse controller 210), collectively referred to as modules of type 233 (reference numeral 233 is not shown in FIG. 9), general purpose modules (GPIO ports 224 and RTC 220), collectively referred to as modules of type 235 (reference numeral 235 is not shown in FIG. 9), power management modules (system wake up control SWC 216 and power on timers 218), collectively referred to as modules of type 237 (reference numeral 237 is not shown in FIG. 9), bus interfaces (host interface 212, and embedded controller interface 228), and configuration module 215. It should be evident that a lesser or greater number of modules 233, 235, 237 and/or other similar module types are within the scope of the invention. For the purposes of the invention, it is only necessary that chip 198 includes at least one legacy module 233, or at least one general purpose module 235, or at least one power management module 237, or at least one other similar module type. Alternatively, chip 198 can include configuration module 215 for the purposes of the invention. Modules 233, 235 and 237 and other similar module types will hereinafter be referred to as modules 241 (reference numeral 241 is not shown in FIG. 9).

Figure 10:
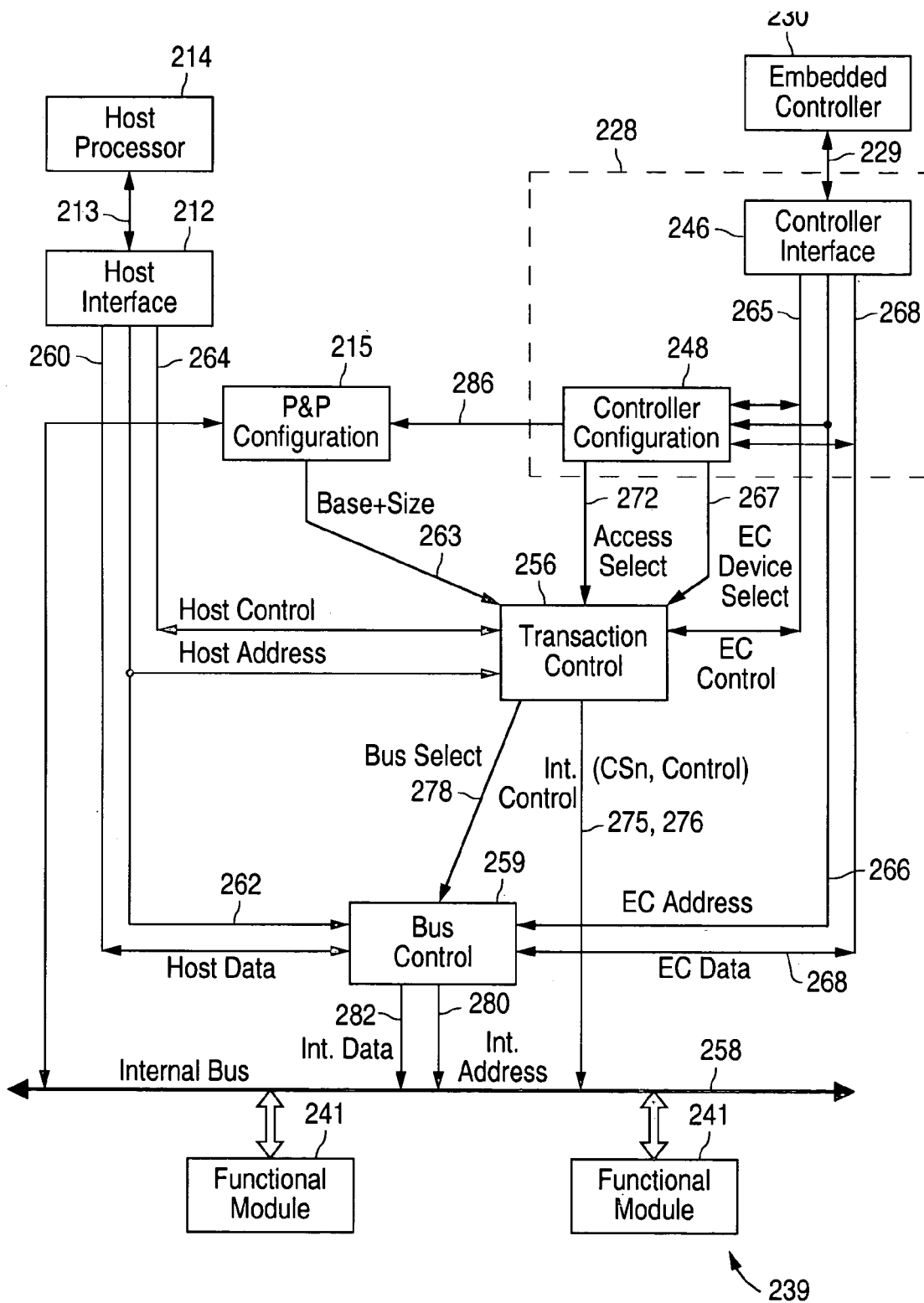
FIG. 10 is a schematic diagram of a bus sharing system according to an embodiment of the present invention.

A main power supply ($V_{DD}$) and a standby (or alternative) power supply ($V_{SB}$) power chip 198. A battery ($V_{BAT}$) provides backup in case of absence of the standby power to some parts of chip 198. FIG. 10 shows a bus sharing system 239 of chip 198, according to an advantageous embodiment of the present invention. Prior to placing signals on internal bus 258, host bus interface 212 and embedded controller interface 228 negotiate control of bus 258 through a transaction control block 256 and a bus control block 259.

Figure 11:
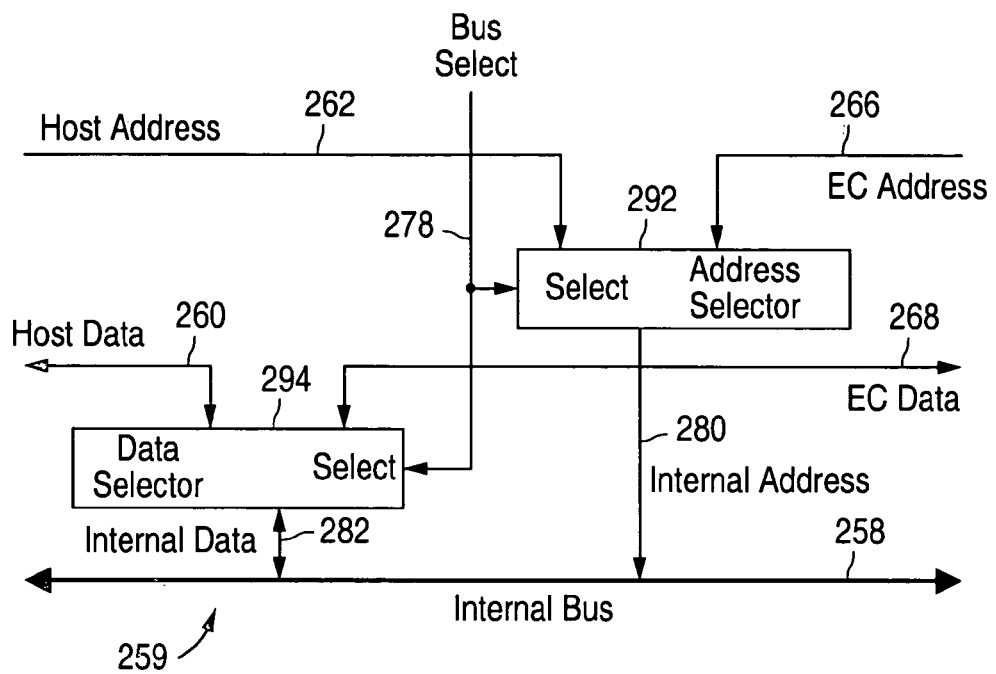
FIG. 11 shows a bus control block according to an embodiment of the present invention.

FIG. 11 illustrates bus control block 259, according to an advantageous embodiment of the present invention. Based on a bus select signal 278 generated from transaction control block 256, a multi-signal switch 292 selects either an address (lower bits) 262 from a host bus 213 or an offset address 266 from an embedded controller bus 229 to be directed to internal bus 258 as an internal address 280. A multi-signal switch 294 selects either data 260 to/from host bus 213 or data 268 to/from embedded controller bus 229 to be directed onto internal bus 258 as internal data 282. Data direction depends on transaction type (read or write).

In addition, transaction control block 256 (of FIG. 10) outputs a chip select 276 for functional module 241 or configuration 215 and receives and transmits internal control signals (for example, read/write, or direct memory access ("DMA") acknowledge indication) 275.

Figure 12:
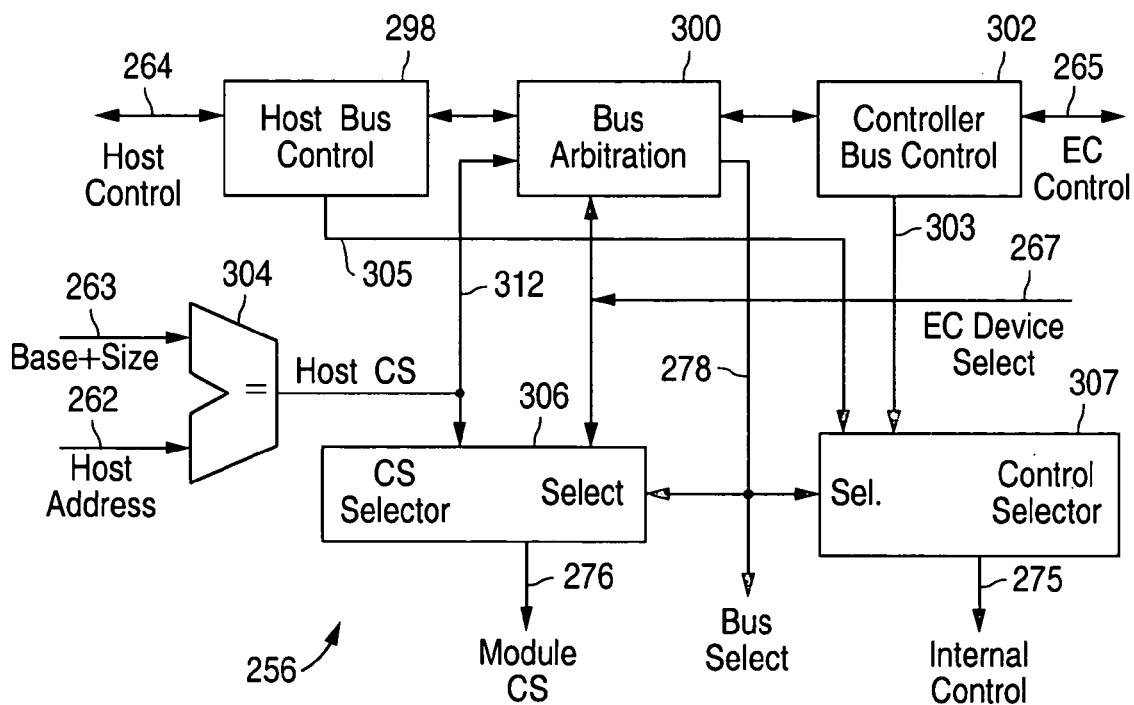
FIG. 12 shows a transaction control block according to an embodiment of the present invention.

FIG. 12 shows transaction control block 256, according to an advantageous embodiment of the present invention. A comparator 304 compares the addresses 262 (higher bits) received from host interface 212 with a stored list of addresses (base+size) 263 corresponding to modules 241 or configuration 215. Based on the comparison, comparator 304 generates a host chip select 312 for functional module 241 or configuration 215.

Based on bus select signal 278, a multi-signal switch 306 selects either host chip select 312 or controller device select 267 to be outputted as module chip select 276. Controller device select 267 is generated by setting specific bit(s) in register(s) in a controller configuration 248 (see FIG. 10).

Also based on bus select signal 278, a multi-signal switch 307 selects either host control signals 305 or controller control signals 303 to be outputted as internal control 275.

Note that controller device select 267 (or any differentiation of a particular module 241 or configuration 215 by embedded controller 230) is a novel feature of the invention. As previously mentioned, in the prior art, shared access between a host and a controller was only for one module and therefore indication of which module a controller wanted to access was unnecessary.

FIG. 12 also shows a bus arbitration block 300 (which generates bus select signal 278) within transaction control block 256, according to an advantageous embodiment of the present invention. Bus arbitration block 300 arbitrates between host bus 213 control signals 264 and an embedded controller bus 229 control signals 265, and allocates control to either host bus 213 or embedded controller bus 229, generally on a "first arrived, first served" basis. Host bus control 298 and controller bus control 302 provide handshaking with bus arbitration 300.

In case of arbitration on a "first arrived, first served" basis, arbitration fairness in one embodiment is resolved via pauses in transaction bursts of each of buses 213 and 229. If pauses in transaction bursts are not implemented, other fairness mechanisms can be implemented to prevent bus starvation.

Figure 13:
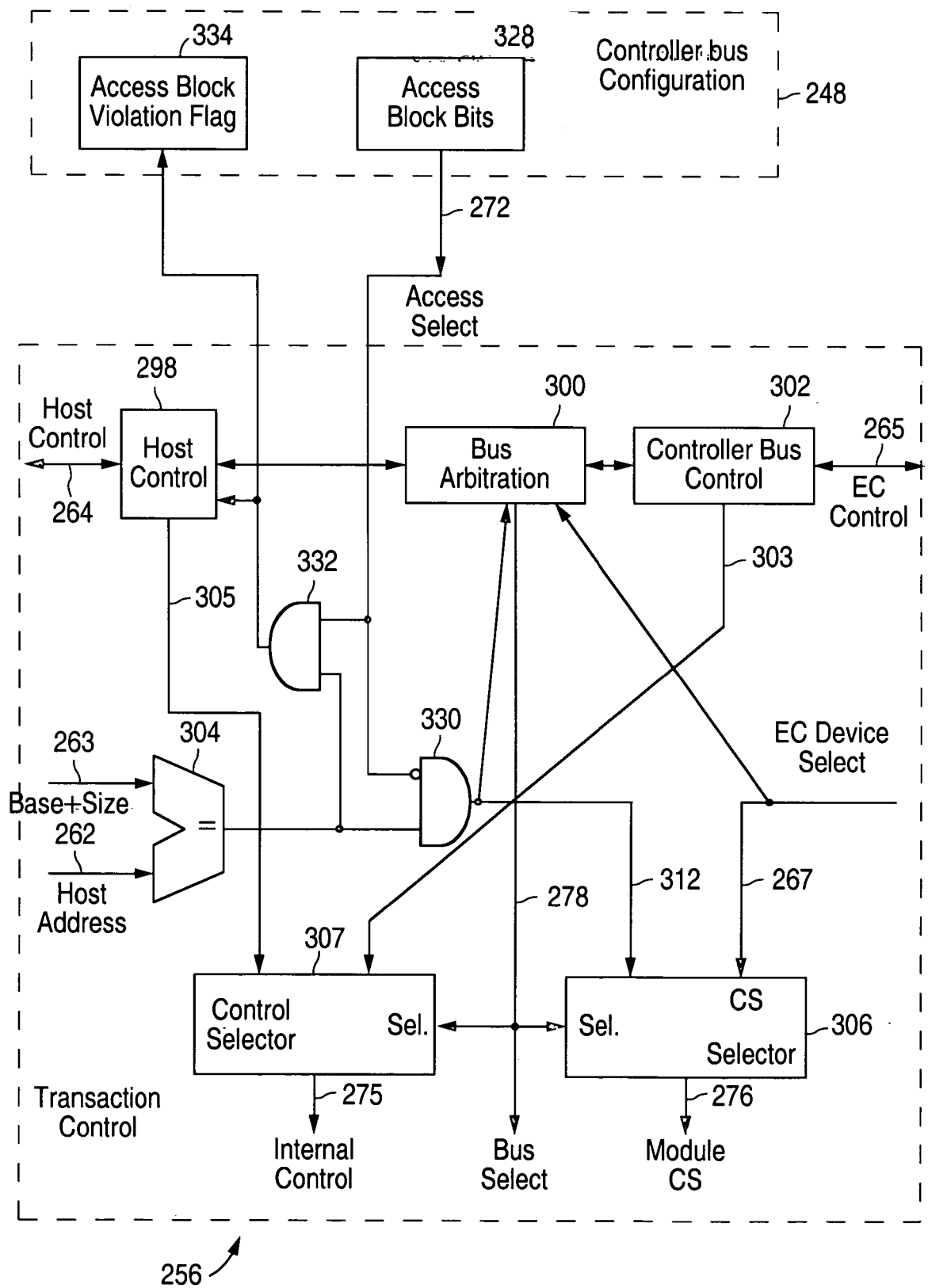
FIG. 13 is a schematic of an access lock sharing scheme according to an embodiment of the present invention.

FIG. 13 shows transaction control module 256, according to an advantageous embodiment of the present invention, in which an additional element, access block bits 328, influences the decision of bus allocation. In essence, the embodiment illustrated in FIG. 13 allows embedded controller 230 to block access by host 214 to one or more modules 241 or device configuration module 215 through an access select signal 272.

For certain modules 241 and/or device configuration module 215 there are corresponding access block bits 328 in controller configuration 248. Embedded controller 230 sets access block bit 328 when it wants to deny access to corresponding module 241 or configuration module 215 from host bus 213. For example, embedded controller 230 may want unhindered access to serial port 202 for modem communication.

If access block bit 328 is set, host chip select of corresponding module 241 or configuration module 215 by host 214 is invalidated (by AND gate 330). In addition, an access block violation flag 334 (generated by AND gate 332) is updated for embedded controller 230 and preferably for host 214 to indicate that an access by host 214 was attempted while access block bit 328 was set.

As an example, there are presented four schemes for responding to an attempt by host 214 to access an access-blocked module of chip 198 (i.e., access-blocked module 241 or access-blocked configuration module 215). The first scheme returns an error indication and denies access by host 214. The second scheme denies access without informing host 214 of the violation. The third scheme extends the transaction using a not-ready indication until the transaction may be completed. The fourth scheme ignores the attempt and denies access, expecting host interface circuitry external to chip 198 to handle the error case. A broken line connecting flag 334 and host control 298 in FIG. 13 connotes that the step of indicating to (i.e., providing an indication to) host 214 is optional. In the first and third schemes, the connection representing circuitry for providing an indication to host 214 is made. In the second and fourth schemes, the connection is not made (i.e., host 214 is not informed of the fact that an access violation occurred).

FIGS. 14A–14D and FIGS. 15A–15D show the four schemes illustrating of how blocked-access is presented to host 214 for host write (FIGS. 14A–14D) and host read (FIGS. 15A–15D) transactions, using as an example an LPC host bus interface. LAD3:0 335, 336, 337, 341, 342, 343, 345 and 346 timing diagrams show the transaction on host bus 213.

In the first scheme illustrated in FIG. 14A, a host attempt to write to an access-blocked module of chip 198 is followed by an error sync 338 from chip 198. The data passed in this transaction is ignored. In the second scheme illustrated in FIG. 14B, a host attempt to write to an access-blocked module of chip 198 is followed by a ready sync 339 from chip 198, in essence, chip 198 not informing host 214 of a problem, but only ignoring the data provided in the transaction. In the third scheme illustrated in FIG. 14C, a not-ready sync 348 is returned to host 214 extending the host access, until the lock is removed at which time the status changes to ready sync 339 and the transaction is successfully completed. Note that in this case the transaction is not completed until it may be executed successfully. In the fourth scheme illustrated in FIG. 14D, a no sync 340 is returned, leaving host 214 with the understanding that the access blocked module of chip 198 does not exist on the bus, and terminating the transaction with a time-out. The time-out mechanism and the reporting to host 214 is part of the chipset which provides the essential functionality of a motherboard. Examples of a time out mechanism and reporting to the host can be found with reference to the 82801AA (ICH) from Intel Corporation of Santa Clara, Calif. available on the World Wide Web at www.intel.com.

FIGS. 15A–15D show the four schemes for host read attempt to access-blocked module of chip 198. The first scheme illustrated in FIG. 15A is similar to FIG. 14A, except that error sync 338 from chip 198 is followed by null data 344 from chip 198. The returned data is zero without actually reading from the access-blocked element. Similarly, in the second scheme illustrated in FIG. 15B, ready sync 339 is followed by null data 344. In the third scheme illustrated in FIG. 15C, the transaction is extended using not-ready sync 348 until it may be successfully completed, in which case the sync is changed to ready sync 339 and the read data 349 is returned. The fourth scheme illustrated in FIG. 15D is similar to FIG. 14D.

Note that syncs (for example error, ready, not ready) are signaling mechanisms used by the LPC protocol. In other embodiments, other means for providing an indication if host 214 attempts to access an access-blocked element of chip 198 can be used such as dedicated signal lines.

Some embodiments of this invention implement all of the protection schemes presented in FIGS. 14A–14D and FIGS. 15A–15D. Other embodiments implement only a subset of the protection schemes presented in FIGS. 14A–14D and FIGS. 15A–15D. For example, the second scheme presented in FIG. 14B and FIG. 15B may be considered satisfactory and implemented solely.

It should be evident that although the embodiment illustrated in FIG. 13 shows embedded controller 230 having the ability to block access by host 214, a complimentary scheme where host 214 could block access by embedded controller 230 would also enable shared access to one or more modules 241 and/or configuration module 215. It should also be evident that certain modules 241 and/or configuration module 215 may have their access blocked by embedded controller 230, while other modules 241 and/or configuration module 215 may have their access blocked by host 214. In case the blocking is allowed for both host 214 and embedded controller 230, it is preferable that there is a mechanism that will guarantee block exclusivity (i.e., only one of the two processors 214 and 230 may block a specific module to prevent access by the other) so as to prevent deadlocks in the handling of a module. However, it is not recommended to implement a stall-until-completed to both processors 214 and 230, because a stall-until completed may cause deadlocks at which each processor is waiting for the other processor to complete the access. Alternatively, other blocking schemes known in the art and not shown in this example could be applied to prevent such deadlocks, if no mechanism to guarantee block exclusivity is implemented. It should also be noted that if embedded controller 230 and host 214 are both reading from the same module 241 or device configuration module 215, blocking access to one or the other of processors 230 or 214 is optional (i.e., if desired, both processors 230 or 214 can read without impeding the operations of one another).

The advantages of preferred embodiments of chip 198 over the prior art are three fold. First, the access to more than one different modules 241 and/or configuration module 215 by host 214 and embedded controller 230 is simplified and unified through the preferred usage of one transaction control 256 and/or one internal bus 258. Transaction control 256 functions as a central block which receives indications by host 214 and embedded controller 230 relating to the selection for accessing of modules 241 and/or configuration module 215 (examples of such indications include device select 267, addresses 262 (higher bits), stored list of addresses (base+size) 263, etc.). Access to the selected modules 241 and/or configuration module 215 by host 214 or embedded controller 230 is provided through one internal bus 258.

Second, with the implementation of the first scheme (illustrated in FIG. 14A and in FIG. 15A) and/or the third scheme (illustrated in FIG. 14C and in FIG. 15C), in addition to informing the processor which is blocking access, the processor (in the example above, host 214) that is attempting access to a blocked module is informed of the violation, and the error is handled through software (first scheme) or hardware (third scheme) to guarantee successful completion of the operation. Third, with the implementation of any of the four schemes illustrated in FIGS. 14A–14D and in FIGS. 15A–15D, the ability to block access is extended to a plurality of modules 241 and/or configuration module 215, allowing orderly shared access to a plurality of modules.

Figure 16:
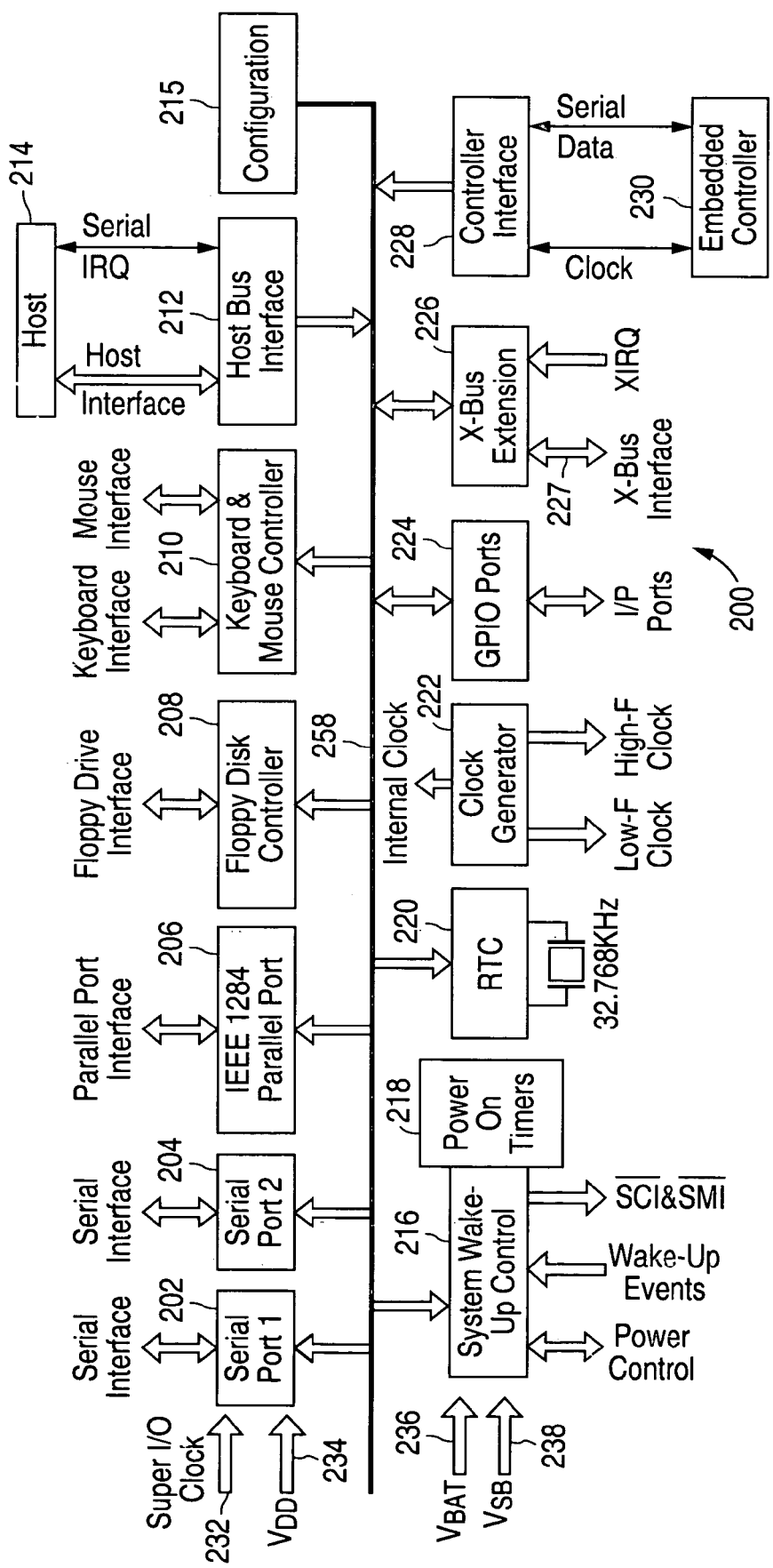
FIG. 16 is a block diagram of another chip according to an embodiment of the present invention.

FIG. 16 illustrates a chip 200 according to an advantageous embodiment of the present invention. Chip 200 has certain added features compared to chip 198. It should be noted that each of the added features of chip 200 listed below is independent of the other features and that the addition of one or more of these features constitutes a separate advantageous embodiment. First, certain advantageous embodiments of chip 200 allow shared access to modules external to the chip (i.e., off bus extensions). Second, certain advantageous embodiments of chip 200 allow access to certain (internal or external) modules in the case of a shut down of the main power supply, because internal bus 258 is powered by both a main power supply and a standby power supply. Third, certain advantageous embodiments of chip 200 ensure that a blocked module is automatically enabled. Fourth, certain advantageous embodiments of chip 200 allow orderly concurrent access, in addition to or instead of sequential exclusive access (sequential exclusive access implying that portions of the same module may be used only by the host 214 or only by the embedded controller 230 within the same period of time).

Hereinafter the term "concurrent" access is used to mean within the same period of time. Concurrent access implies that both processors can non-exclusively access a module. If both processors wish to access the same module simultaneously, bus arbitration will allow first one processor to access the module, and then the second processor to access the module.

Figure 19:
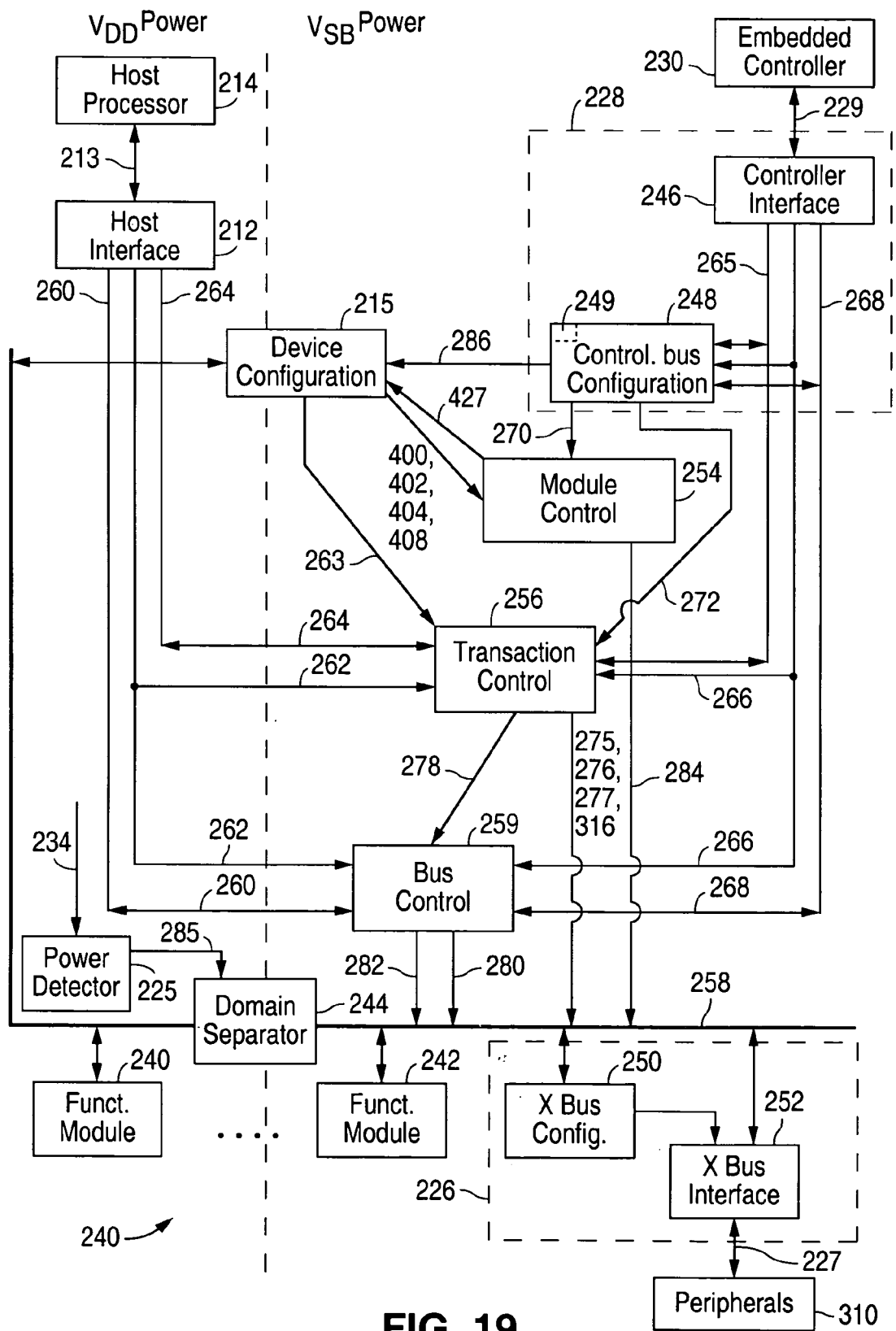
FIG. 19 is a schematic diagram of another bus sharing system according to an embodiment of the present invention.

Besides the components included in chip 198, chip 200 preferably includes a bus extension 226 (to external modules 310 including but not limited to memory and/or input/output devices). Each external module 310 can be either an external device or a part of an external device. One embodiment of bus extension 226 is shown in FIG. 16 as an X-Bus extension. In other embodiments bus extension 226 can be any other type of bus extension capable of read/write operations and which may be also stalled through a ready indication. Bus extension 226 allows the transfer of information including but not limited to internal data 282, internal addresses 280, control signals (including read/write indications) 275, zone or chip selects 277 and/or 316, etc. between internal bus 258 and external modules 310 (as shown in FIG. 19). Just as chip 198 needs only to include one module 241 (and not all modules 241 shown in FIG. 9) or alternatively configuration module 215, chip 200 needs only to include one module 241, configuration module 215 or bus extension 226 for the purposes of the invention.

Figure 17:
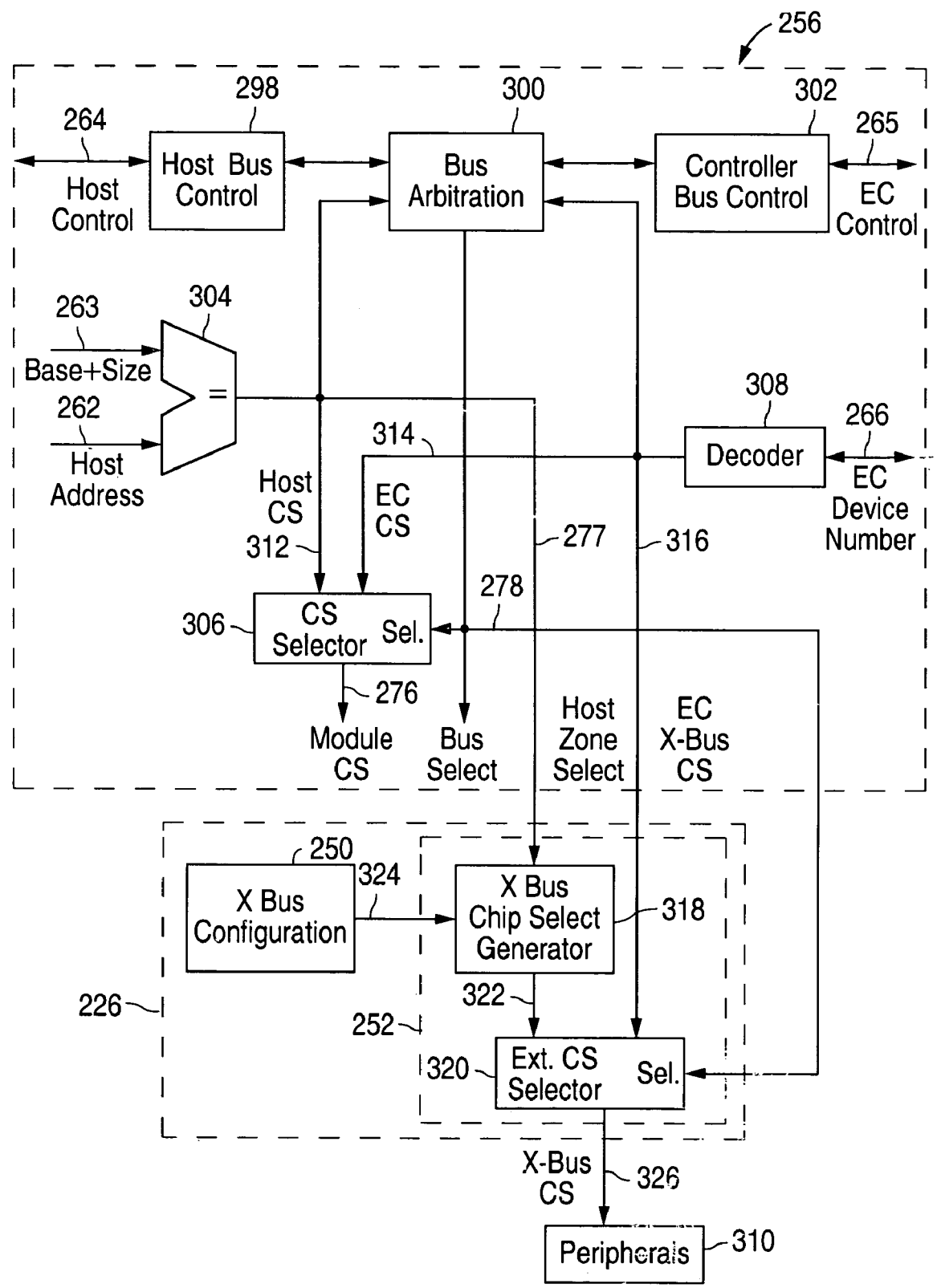
FIG. 17 shows a transaction control block and external chip selects according to an embodiment of the present invention.

The advantageous embodiment illustrated in FIG. 17 is similar to the advantagous embodiment illustrated in FIG. 12 but is adapted to also allow shared access to external modules 310 accessible through bus extension 226. The advantageous embodiment of FIG. 17 also differs from that of FIG. 12 in that embedded controller 230 sends a device number (for internal modules 241 or configuration module 215) which needs to be decoded rather than device select 267. Both device numbers and external chip selects (shown both as signal 266) from embedded controller 230 pass through a decoder 308 within transaction control 256. Only the features of the embodiment of FIG. 17 which differ from the embodiment illustrated in FIG. 12 are discussed below.

If access to one or more external module 310 is desired, transaction control block 256 outputs a zone/chip select signal 277/316 for bus extension 226. In this case, comparator 304 compares the addresses (higher bits) 262 received from host interface 212 with a stored list of addresses (base+size) 263 corresponding to zones on bus extension 226 received from configuration module 215. Based on the comparison, comparator 304 generates a zone select signal 277 for bus extension 226. Embedded controller 230 sends a controller external chip select 316 for external module 310 rather than the address (higher bits). This is equivalent to defining each external module 310 as a block with an offset address within the block.

Bus extension 226 receives host zone select 277 and/or controller external chip select 316 from transaction control 256. A bus extension chip select generator 318 translates zone select 277 into a host external chip select 322 using zone configuration data 324 received from the bus extension configuration 250. In this operation one or more zones are mapped to one host external chip select 322, based on the combination defined in configuration register 250. This mapping allows a reduction in the number of external chip select signals 326 outputted by chip 200. A multi-signal switch 320 selects between chip selects 322 and 316 and outputs an external chip select 326. Subsequent decoding of address lines on bus 227 (shown in FIG. 16) is used in certain embodiments to identify a specific zone or address within the zone. Note that external chip select signal 326 that is output from chip 200 is shaped to meet the bus protocol of bus 227 (shown in FIG. 19) used for accessing external module 310. The parameters required for this shaping are in certain embodiments stored in registers such as those in the X-Bus configuration 250. The parameters in certain embodiments are identical for all zones, and in other embodiments the parameters vary per zone. An example of configuration 250 and X-Bus chip-select generator 318 is available on the World Wide Web at www.national.com for National Semiconductor Corporation's PC87393 device.

In the embodiment illustrated in FIG. 17, embedded controller 230 sends controller logic device number for module 241 or configuration module 215 plus address offsets to chip 200, instead of device select 267. No comparison with a stored list of addresses is necessary. However decoder 308 decodes the device number received from embedded controller bus 229 to generate an internal chip select 314 for module 241 or configuration module 215.

It should be evident that host 214 could instead send host logical device numbers and/or chip selects, and/or embedded controller 230 could instead send addresses (and/or device selects 267 for modules 241 or configuration module 215) provided chip 200 supported these changes. For example, in an embodiment where host 214 instead sends external chip selects, no translation of zones are necessary (i.e., X-Bus chip-select generator 318 and parts of the configuration 250 are not needed). In an embodiment where the controller sends addresses rather than a controller external chip select, a bus extension configuration and generator would need to perform zone translation for controller addresses.

Figure 14:
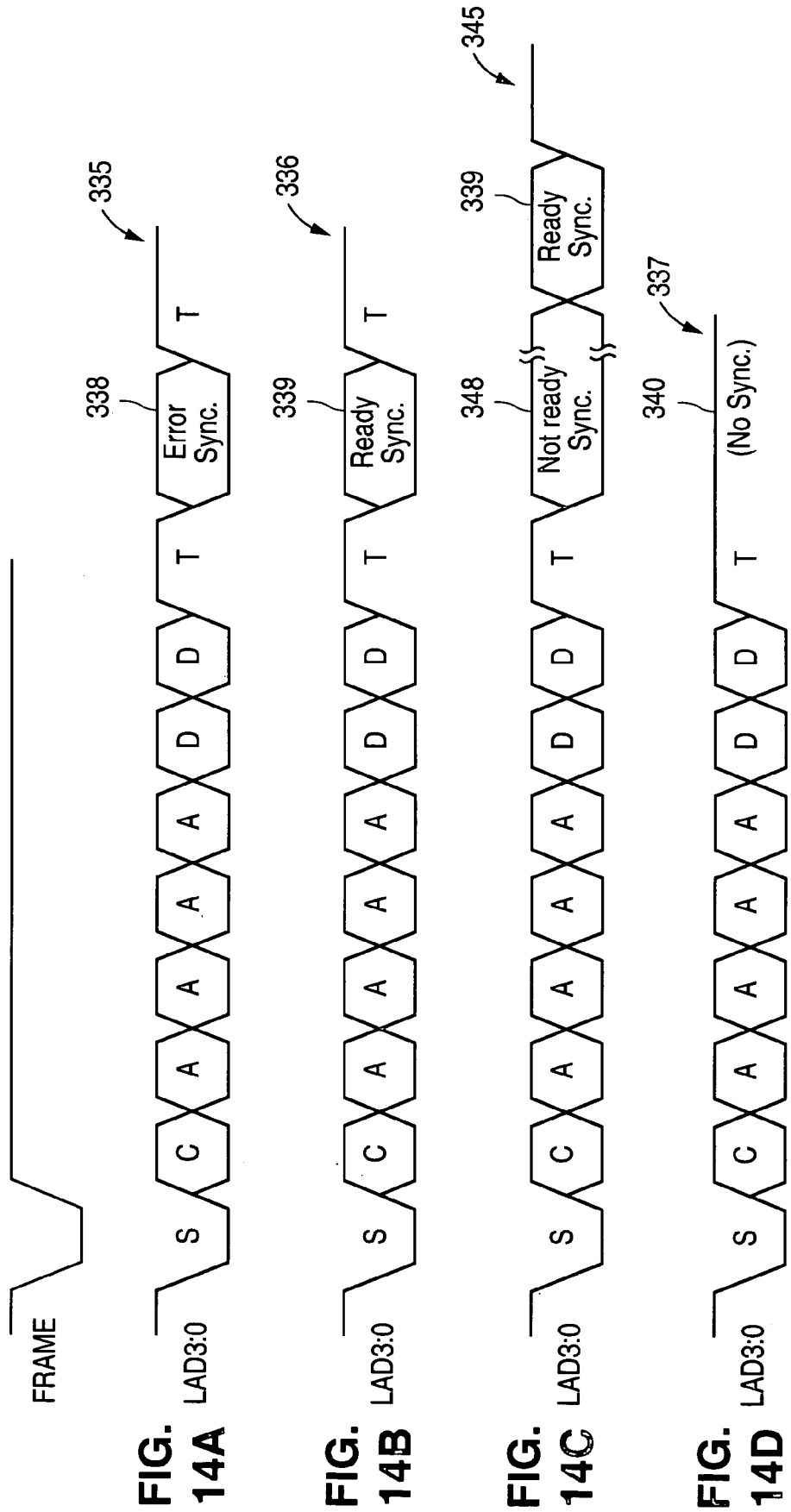
FIG. 14A shows a timing diagram of a first option of how blocked access is presented to a host processor attempting a write operation according to an embodiment of the present invention.
FIG. 14B shows a timing diagram of a second option of how blocked access is presented to a host processor attempting a write operation according to an embodiment of the present invention.
FIG. 14C shows a timing diagram of a third option of how blocked access is presented to a host processor attempting a write operation according to an embodiment of the present invention.
FIG. 14D shows a timing diagram of a fourth option of how blocked access is presented to a host processor attempting a write operation according to an embodiment of the present invention.
Figure 15:
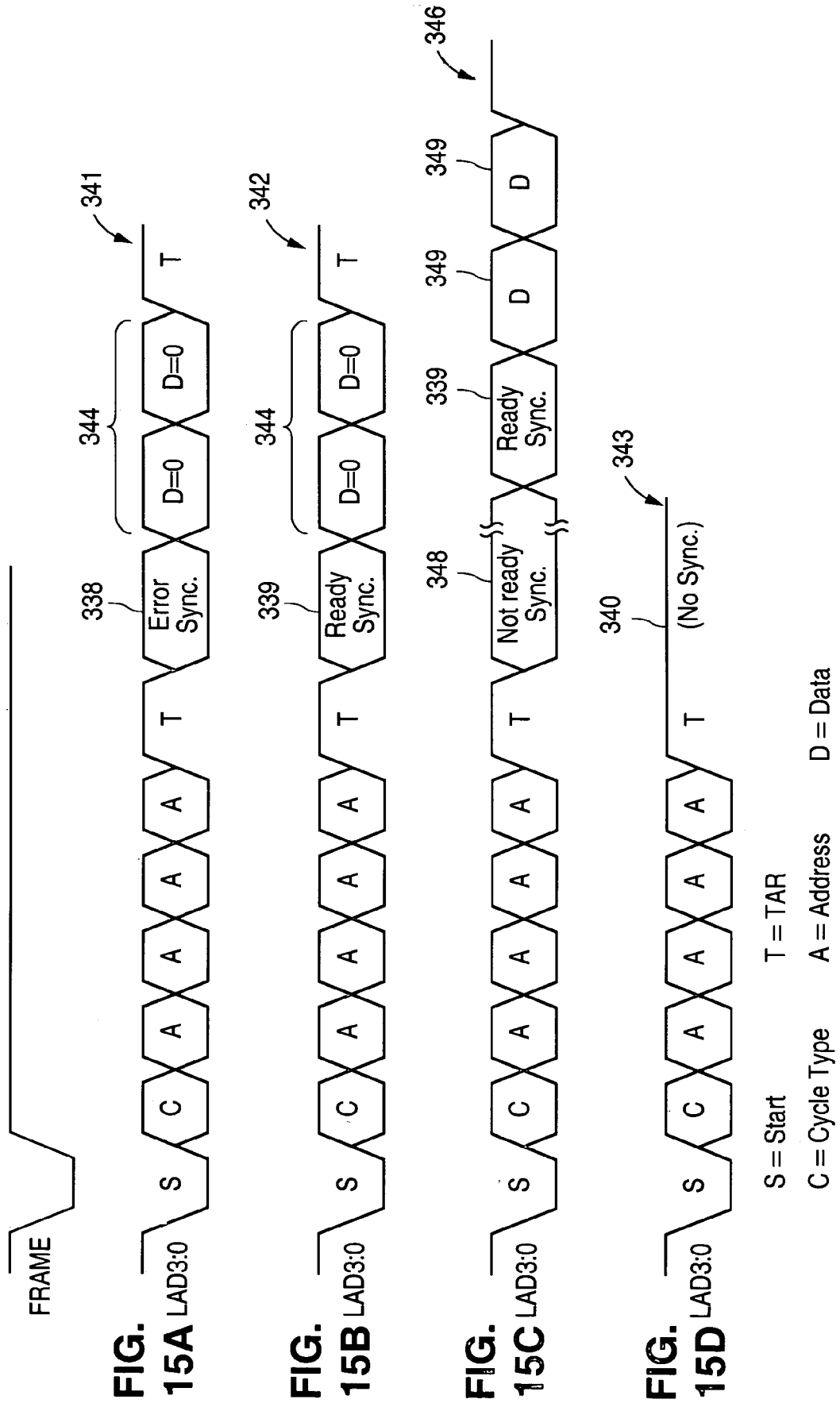
FIG. 15A shows a timing diagram of a first option of how blocked access is presented to a host processor attempting a read operation according to an embodiment of the present invention.
FIG. 15B shows a timing diagram of a second option of how blocked access is presented to a host processor attempting a read operation according to an embodiment of the present invention.
FIG. 15C shows a timing diagram of a third option of how blocked access is presented to a host processor attempting a read operation according to an embodiment of the present invention.
FIG. 15D shows a timing diagram of a fourth option of how blocked access is presented to a host processor attempting a read operation according to an embodiment of the present invention.
Figure 18:
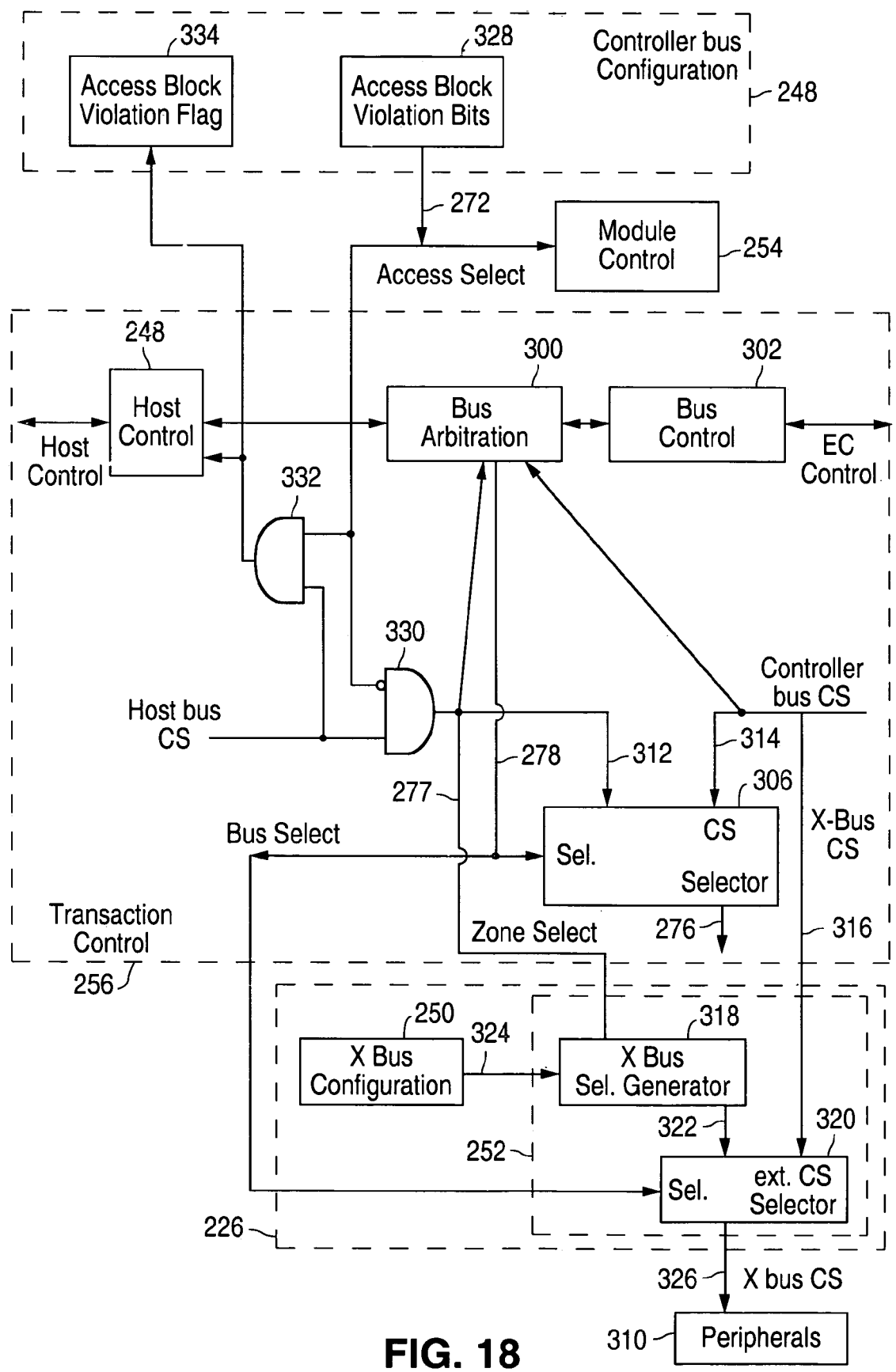
FIG. 18 shows a schematic diagram of an access block sharing scheme that can also be used for external chip selects according to an embodiment of the present invention.

In an advantageous embodiment, embedded controller 230 can block access by host 214 to individual external chip selects 326 (controlling one or more external modules 310) as shown in FIG. 18, using similar schemes to the ones illustrated in FIGS. 13, 14 and 15 and described above. When access block bit 328 corresponding to one or more external chip selects 326 is set, host zone select 277 is invalidated by AND gate 330. As mentioned above with reference to FIG. 13, a complementary embodiment in which host 214 blocks access by embedded controller 230, or an embodiment in which access to certain modules 241 and/or configuration module 215 and/or external chip selects 326 is controlled by host 214 and access to others is controlled by embedded controller 230 are within the scope of the invention.

Host control signal 305, multi-signal switch 307, controller control signals 303, and internal control 275, shown in FIG. 12 and FIG. 13 were left out of FIG. 17 and FIG. 18 in order to not complicate those figures. In addition, decoder 308 shown in FIG. 17 was left out of FIG. 18 so as to not complicate the figure.

An advantageous embodiment of chip 200 illustrated in FIG. 16 includes three power sources, a main power $V_{DD}$ 234, an alternative or standby power supply ($V_{SB}$) 238, and a battery back up source ($V_{BAT}$) 236. $V_{SB}$ 238 is a standby supply in the sense that in some of the system power states main power supply $V_{DD}$ 234 may be off while standby power supply $V_{SB}$ 238 is active and used to support some of the system states and critical operations. It is also typical for $V_{SB}$ 238 to be turned on while there is AC power to the system. Thus, operation of $V_{SB}$ powered elements is expected even when $V_{DD}$ 234 is absent, but not vice versa. In addition, no damage to the system will therefore occur if at any given time $V_{DD}$ 234 is active while $V_{SB}$ 238 is off. In a similar way, $V_{BAT}$ 236 is used to backup some states and activities (such as real time clock 220) even when $V_{SB}$ 238 is off (e.g., the system is plugged out of the wall).

In the embodiment illustrated in FIG. 16, power supply ($V_{DD}$) 234 powers host bus interface 212, legacy modules 233, and part of configuration module 215. Standby power supply ($V_{SB}$) 238 powers embedded controller interface 228, bus extension 226, GPIO ports module 224, part of configuration module 215, and part of System Wake-Up Control ("SWC") 216. RTC 220, power on timers 218 and part of SWC 216 are powered by $V_{PP}$ power, which is a switch between battery ($V_{BAT}$) 236 and $V_{SB}$ 238. $V_{PP}$ is used as a means to save battery power by supplying power from $V_{SB}$ 238 to modules connected to $V_{PP}$ as long as $V_{SB}$ 238 is on, and when it is identified that $V_{SB}$ 238 has failed, switching to the use of $V_{BAT}$ 236 in a seamless way to the operation of modules connected to $V_{PP}$. It should be evident that $V_{DD}$ 234 and $V_{SB}$ 238 can distribute their power among modules 241, configuration module 215, and bus extension 226 in a different manner than illustrated by FIG. 16. All of modules 241 powered by $V_{DD}$ power 234 are hereinafter referred to as modules 240. All of modules 241 powered by $V_{SB}$ 238 or $V_{PP}$ are hereinafter referred to as modules 242.

FIG. 19 shows more details of the power sharing, according to an advantageous embodiment of the present invention. The embodiment illustrated in FIG. 19 is an improvement over the prior art in that not only the powering of modules 241 are shared between $V_{DD}$ 234 and $V_{SB}$ 238, but also the powering of internal bus 258 is shared by $V_{DD}$ 234 and $V_{SB}$ 238. Note that because $V_{SB}$ 238 is a standby power source, $V_{SB}$ 238 may be working even if $V_{DD}$ 234 is off. The advantage of shared powering of internal bus 258 is that if $V_{DD}$ 234 is shut off, modules 242 and/or any external modules 310 powered by $V_{SB}$ 238 (provided bus extension 226 is also powered by $V_{SB}$ 238) and/or the parts of configuration module 215 powered by $V_{SB}$ 238 can still be accessed using the same internal bus 258. No separate bus(es) to the $V_{SB}$ 238 powered items are necessary. Note also that both modules and parts of modules powered by $V_{SB}$ 238 and modules and parts of modules powered by $V_{DD}$ 234 are connected to the same internal bus 258 (either directly or indirectly through bus extension 226). Recall that in prior art chip 115 (FIG. 6) two separate buses were needed for host 114 and controller 113, each powered by a different source.

In the particular embodiment illustrated by FIG. 19, controller interface 228 is also powered by $V_{SB}$ 238 so embedded controller 230 is the processor able to access modules 242 and/or any external modules 310 powered by $V_{SB}$ 238 (provided bus extension 226 is also powered by $V_{SB}$ 238) and/or the parts of configuration module 215 powered by $V_{SB}$ 238 even if $V_{DD}$ 234 were off. However, it should be evident that if host interface 212 is powered by $V_{SB}$ 238, host 214 would be the processor able to access the $V_{SB}$ 238 powered items, even if $V_{DD}$ 234 were off.

If $V_{DD}$ power 234 goes off, a domain separator 244 (FIG. 19) de-links the portions of an internal bus 258 powered by $V_{DD}$ 234 from the rest of internal bus 258 to prevent damage to any components of chip 200. Domain separator 244 thereby isolates the modules or parts of modules powered by $V_{DD}$ 234 from modules or parts of modules powered by $V_{SB}$ 238. Co-pending U.S. Patent Application Ser. No. 09/780, 100 entitled "Multiple Supply Design Methodology" filed on Feb. 9, 2001, and assigned to National Semiconductor Corporation describes how to handle signals that go between $V_{SB}$ 238 and $V_{DD}$ 234 powered source (driver) and destination (input gate) locations in chip 200 and is fully incorporated herein by reference.

In order to successfully share power on internal bus 258, one or more of the following features are preferably implemented in advantageous embodiments of the present invention. It should be noted that each of the following features is independent of the other features and that the addition of one or more of these features constitutes a separate advantageous embodiment of the invention. First, all blocks involved in arbitration between host 214 and embedded controller 230, including a module control block 254 (to be discussed below), transaction control 256 and bus control 259 are powered by $V_{SB}$ 238 (as illustrated in FIG. 19). Second, power on detect circuits are used to determine if $V_{DD}$ 234 and/or $V_{SB}$ 238 are within a specified active range (i.e., within chip 200 specifications). In the embodiment illustrated in FIG. 19, the main $V_{DD}$ 234 power on detect circuit 225 outputs a "$V_{DD}$ good" signal 285. Third, address, data, and control signals are buffered to isolate the two separately powered parts of internal bus 258 (using elements described in U.S. patent application Ser. No. 09/780,100 entitled "Multiple Supply Design Methodology" referred to above). Fourth, an indication is given if $V_{DD}$ 234 is off. By way of a non-limiting example, in one embodiment assuming controller interface 228 is powered by $V_{SB}$ 238 a bit 249 shown in controller configuration 248 of FIG. 19 provides an indication to embedded controller 230 that $V_{DD}$ 234 is off. Fifth, access to modules 240 and the parts of configuration module 215 powered by $V_{DD}$ 234 is prevented while $V_{DD}$ 234 is off. An example of a method of preventing access to non-powered modules will be discussed below with reference to FIG. 26. Sixth, in the case of certain modules 310 powered by $V_{DD}$ 234 and bus extension 226 powered by $V_{SB}$ 238, it is preferable that a protection mechanism (not shown) is implemented to allow signals on bus extension 226 to remain active when $V_{DD}$ 234 is off, without damaging modules 310 that are powered by $V_{DD}$ 234. Seventh, different power on reset circuits are used for $V_{DD}$ powered elements and $V_{SB}$ powered elements. Finally, if a power source goes off (for example $V_{DD}$ 234), the corresponding reset circuit continues to operate for a short time after the power comes back up so that elements powered by the previously off power source "wake up" in a known state.

Figure 20:
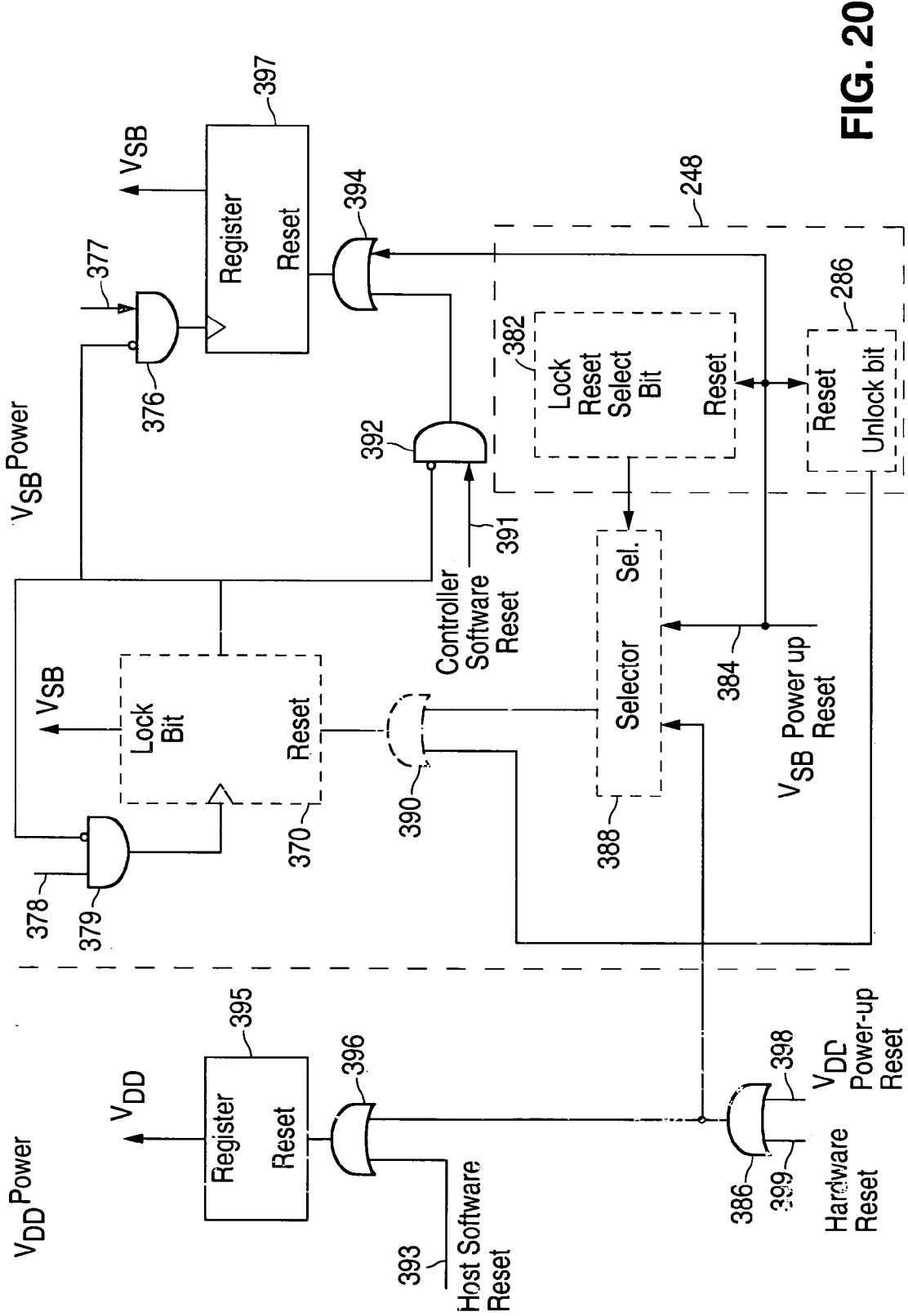
FIG. 20 shows reset circuits according to an embodiment of the present invention.

The embodiment of FIG. 20 shows exemplary reset circuits for resetting bits 395 powered by $V_{DD}$ 234 and bits 397 powered by $V_{SB}$ 238, within chip 200 or in modules 310 (off bus extension 226). The embodiment in FIG. 20 continues with the assumption of a $V_{DD}$ powered host interface 212 and a $V_{SB}$ powered controller interface 228. However it should be evident to those skilled in the art that the reset circuits could be adjusted for the opposite case.

Bits 395 in certain embodiments are reset through a host software reset 393, a hardware reset 399 or a $V_{DD}$ power-up 398. Bits 397 in certain embodiments are reset through $V_{SB}$ power up reset 384 or a controller software reset 391. If bits 397 have a corresponding content lock bit 370, controller software reset 391 resets bits 397 only if bits 397 are not locked (i.e., corresponding lock bit 370 equals zero ("0")). It should be appreciated that there are multiple content block bits 370, which in certain embodiments are located in configuration module 215, modules 241 or in modules 310, each related to different groups of lockable bits 397. In addition, there are numerous bits 397 without any content lock bits 370, (i.e., there are numerous unprotected bits 397). Therefore, content lock bit 370 and all related circuitry are shown as optional (with broken lines).

Content lock bits 370 are locked through locking register select 378 originating from embedded controller 230 or host 214 (via internal bus 258). When specific contents lock bit 370 is set, specific content lock bit 370 and therefore all corresponding protected bits 397 become read only and can not be further modified by host 214 or by embedded controller 230. (In the embodiment shown in FIG. 20, an AND gate 376 does not allow further writing even if protected bits 397 are selected through protected register select 377, if lock bit 370 is set. Also in FIG. 20, an AND gate 379 causes the locking of content lock bit 370, if content lock bit 370 is set.) Content lock bits 370 can be unlocked (reset) by corresponding unlock bits 286 (located in certain embodiments in controller configuration 248 and accessible by embedded controller 230 only, in the case of controller interface 228 powered by $V_{SB}$ 238) via OR logic gate 390.

In addition, in certain embodiments a reset select bit 382 is located in controller configuration 248 (again, accessible by embedded controller 230 only, in the case of controller interface 228 powered by $V_{SB}$ 238). Reset select bit 382 selects using a multi-signal switch 388 the type of reset which clears all contents lock bits 370, either a main power up reset ($V_{DD}$ or hardware reset) 386, or an alternative ($V_{SB}$) power up reset 384. The option of using $V_{DD}$ power up reset 386 for clearing contents lock bits 370 is especially useful in the case in which only $V_{DD}$ power 234 was off and so the option of $V_{SB}$ power up reset 384 does not exist. The clearing of contents lock bits 370 by $V_{DD}$ power-up (or hardware) reset 386, $V_{SB}$ power-up reset 384 or controller command (through a write to unlock bit 286) depends on the degree of trust put into any operation (trust on the software being error free and/or malicious virus free), and on the system-wise functionality assigned to it. For example, when the functionality of embedded controller 230 does not include system configuration, and the system configuration is left to the host software, then controller command is less likely to be used to clear contents lock bits 370. As another example, if embedded controller 230 does not support reset of content lock bits 370, reset of content lock bits 370 by a $V_{DD}$ power-up (or hardware) reset 386 may be required.

It should be evident that content lock bits 370 are an example of bits powered by $V_{SB}$ 238 whose type of reset may be selected, and that in certain embodiments reset select bit 382 selects the type of reset (main or alternative power up) to reset other types of bits powered by $V_{SB}$ 238. Note also that reset select bit 382 is used as an example of a generator for generating a reset select signal. In other embodiments, the generator for generating a reset select signal may be external to chip 200 with the reset select signal inputted into chip 200.

In advantageous embodiments of the present invention, access block bit 328 can force the enabling of blocked module 241 and/or provide an alternative indication to host 214. Enabling of a module typically implies that the module is activated (the internal clock is running); the resources of the module are assigned (for example, base address/size, interrupts, DMA); and/or the runtime registers of the module 45 are enabled for access. In general, no two modules can use the same resources without collision.

Figure 21:
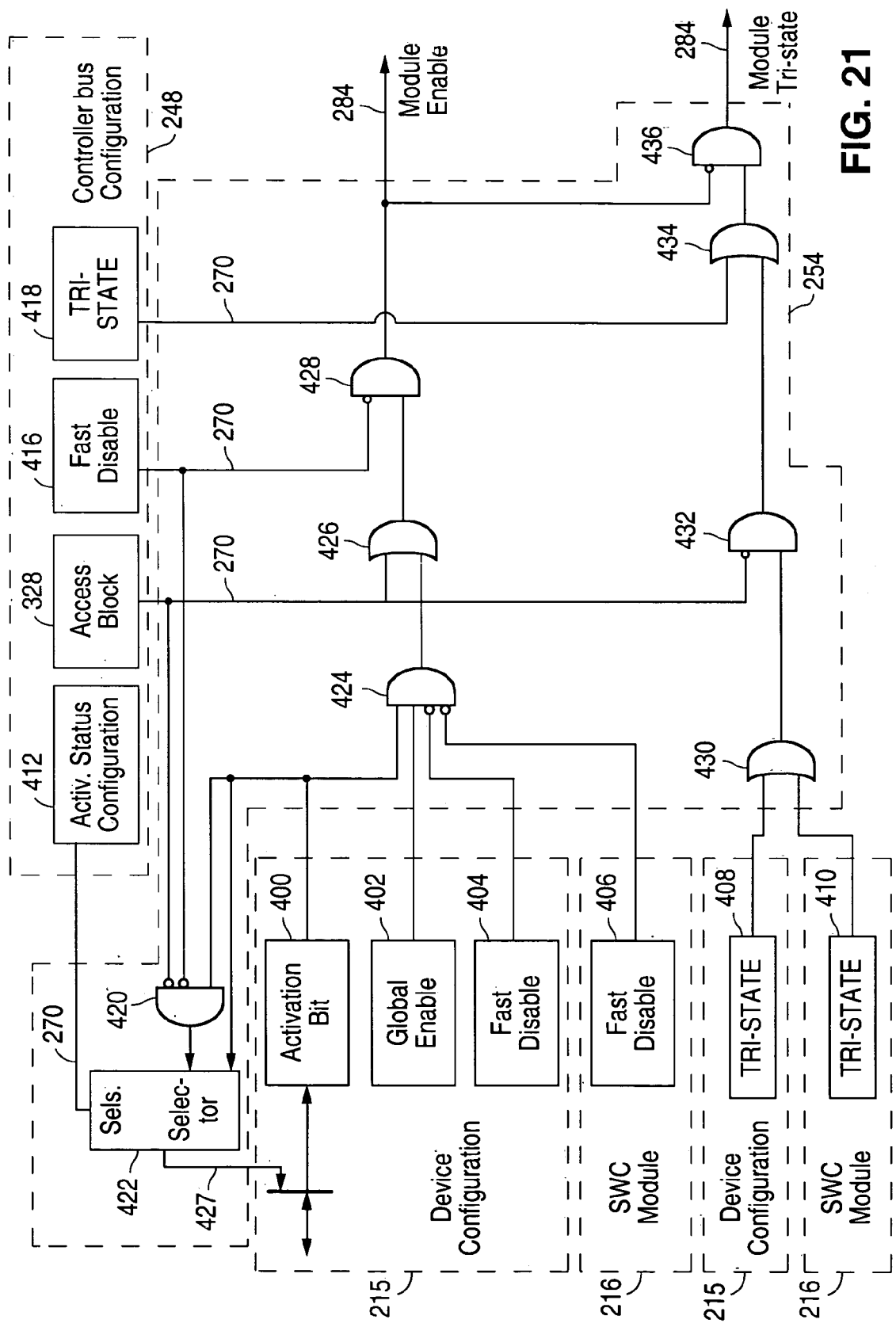
FIG. 21 is a block diagram of a module control block according to an embodiment of the present invention.

FIG. 21 shows an embodiment of module control block 254 in which access block bit 328 can force the enabling of a blocked module 241. The outputs 284 of module control block 254 in this embodiment include module enable and module tri-state (output disable) signals.

In the embodiment illustrated in FIG. 21, as configuration module 215 is accessible via internal bus 258, both embedded controller 230 and host 214 can access configuration module 215. Therefore both embedded controller 230 and host 214 can enable certain modules 241, disable certain modules 241, or disable the output buffer (i.e., put into tri-state) of certain modules 241 using bits 400, 402, 404 and 408 included in configuration module 215.

Module control block 254 in the embodiment of FIG. 21 allows controller 230 to override the settings of bits 400, 402, 404 and 408 in configuration module 215 (and in essence also override host 214 which may have set the settings).

Within configuration module 215 in the embodiment of FIG. 21, each module 241 has one logical device activate bit 400. In addition, certain modules 241 can be disabled through corresponding disable bits 404 (sometimes called fast disable bits) and certain modules 241 can be put into tri-state through corresponding tri-state bits 408. Enable bit 402 enables all modules 241. For power management purposes, in the embodiment of FIG. 21, SWC module 216 also has the ability to disable or disable output buffer (i.e., put into tri-state) certain of modules 241 using bits 406 and 410. The reason for having a variety of enable and disable means is because of the differing structures of host software for system configuration and power management, deriving from differing legacy and access structures. In addition, the variety of enable and disable means is due to the need to combine host 214 operations with embedded controller 230 operations, in a way that both allows embedded controller 230 to enable modules for its own use without interfering with the operations of host 214, and at the same time prevents the programs of host 214 from impairing the operations of embedded controller 230.

As mentioned above with reference to FIG. 13 and FIG. 18, in controller configuration 248, there are access block registers including access block bits 328 for certain of modules 241. In embodiments including sample module control block 254 of FIG. 21, when embedded controller 230 sets an access block bit 328, corresponding module 241 is enabled regardless of the value of corresponding bits 400, 402, 404, and/or 406. In the same vein, in certain embodiments corresponding module 241 can not be in the tri-state mode, when access block 328 is set, regardless of the value of bits 408, and/or 410. However, for certain modules 241 a controller disable bit 416 (sometimes called a fast disable bit) overrides both corresponding access block 328 and corresponding bits 400, 402, 404, and 406 in certain embodiments. For certain modules 241, a controller tri-state bit 418 overrides both corresponding access block 328 and corresponding bits 408 and 410 in certain embodiments.

In certain embodiments an activation status configuration bit 412 (in this example a global bit) accessible by embedded controller 230 selects (through a signal 270) whether host 214 when reading activation bit 400 for a particular module 241 reads the value of activation bit 400 or the actual activity status of the module (i.e., reads a zero ("0") if corresponding access block 328 or disable bit 416 are set). The output 427 of selector 422 is given to configuration module 215. By allowing host 214 to read a zero ("0"), embedded controller 230 provides an indication to host 214 that particular module 241 is deactivated or owned by the controller. Circuitry 420 and 422 are an example of circuitry for providing this indication. This indication is in addition to or instead of any indication provided as explained with reference to FIG. 13 and FIG. 18.

Logical circuitry 420, 422, 424, 426, 428, 430, 432, 434, and 436 located in module control block 254, and signal 270 between controller configuration 248 and module control 254 provide one possible arrangement to allow the functioning explained above.

In advantageous embodiments of the present invention, concurrent shared access by embedded controller 230 and host 214 to certain modules 241 or configuration module 215 is available. In contrast to the scheme of FIG. 13 and FIG. 18 (which as mentioned above requires blocking of the whole module for the purposes of writes and other non-read operations) module/chip selection by both embedded controller 230 and host 214 are allowed onto internal bus 258, and within the selected module 241 or 215 itself there is a differentiation in the processing of transactions based on whether the transactions originated from embedded controller 230 or host 214. For example, in certain embodiments access control circuitry within selected module 241 or 215 regulates access within selected module 241 or 215 by embedded controller 230 and host 214.

For the purposes of the discussion below, it is assumed that if bus select 278 is zero ("0"), it is an indication that the transaction (e.g., data, addresses) on internal bus 258 originated from embedded controller 230 and if bus select 278 is one ("1"), it is an indication that the transaction originated from host 214.

Figure 22:
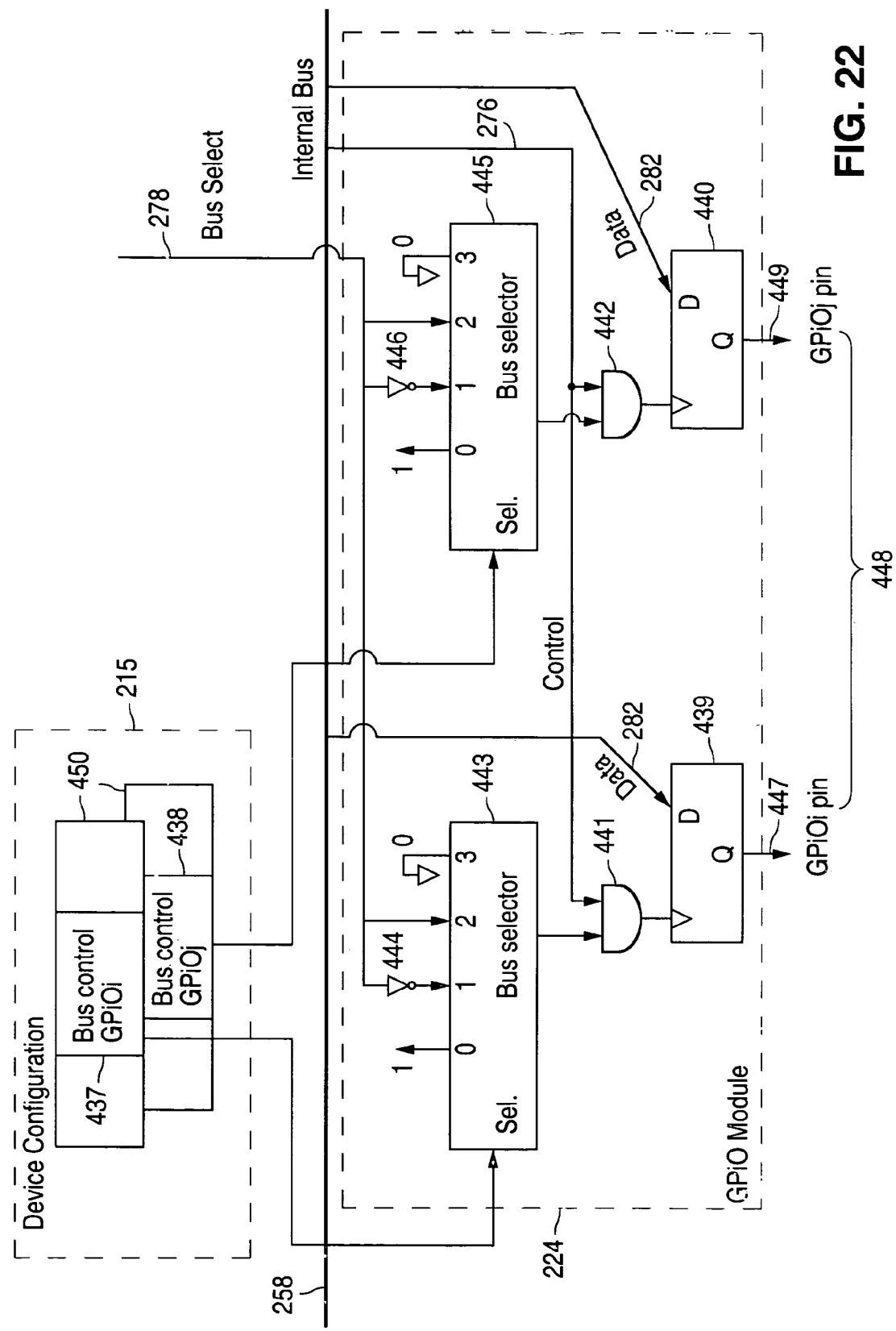
FIG. 22 shows a concurrent access scheme according to an embodiment of the present invention.

FIG. 22 shows a scheme for concurrent access to different sub-elements of a module 241 or configuration module 215 where ownership of different sub-elements for writing are assigned to either controller bus 229, host bus 213 or both, according to an advantageous embodiment. (Reading does not require this scheme as both controller bus 229 and host bus 213 can always read from the same sub-element without affecting each other). By way of a non-limiting example, FIG. 22 shows the scheme for GPIO module 224, where different pins 448 of GPIO module 224 are assigned to the ownership of either controller bus 229, host bus 213 or to both controller bus 229 and host bus 213. Ownership for each pin 448 is assigned by setting one or more bits in one or more registers 450 in device configuration module 215. It is assumed for the sake of a non-limiting example that ownership bits are "zero zero" ("00") for ownership by both buses 229 and 213, "zero one" ("01") for ownership by controller bus 229, "one zero" ("10") for ownership by host bus 213, and "one one" ("11") disable access for both (or may be "reserved").

The example in FIG. 22, shows ownership bits 437 for pin i 447 and ownership bits 438 for pin j 449. Using a multiplexer 443, only a transaction originating from the bus or buses which own pin i 447 is allowed through, provided also that module 224 has been selected (using module chip select 276) and offset address 280 of the group to which pin i 447 belongs has been specified. Similarly, use of a multiplexer 445 only allows through a transaction originating from the bus or buses owning pin j 449, provided also that module 224 has been selected and offset address 280 of the group to which pin j 449 belongs has been specified. Multiplexers 443 and/or 445 are examples of an access control circuitry used to regulate access within module 224, and direct transactions (or parts of transactions such as data 282) to sub-elements owned by the originating processor 214 or 230 of the transaction. Logic circuitry 439, 440, 441, 442, 444, and/or 446 are also examples of an access control circuitry used to regulate access within module 224, and direct transactions (or parts of transaction such as data 282) to sub-elements owned by the originating processor 214 or 230 of the transaction.

In certain non-limiting embodiments, ownership bits 437 and 438 can be set by either host 214 or embedded controller 230 but may be changed only by the owner(s) of pins 447 and 449 respectively.

It should be evident from the scheme of FIG. 22 in the case of one bus owning a sub-element, that if host 214 (or embedded controller 230) attempts to write to sub-element 448 which is not owned by host 214 (or embedded controller 230, respectively), chip 200 can respond as in one of the schemes illustrated in FIGS. 14A–14D, adapted for the protocol and interface used (for example, either with error sync 338, ready sync 339, a wait until the transaction may be completed, or no sync 340, depending on the specific embodiment). Alternatively, the response of chip 200 in certain embodiments may be limited to a subset of the schemes illustrated in FIGS. 14A–14D. In the case the host 214 (or embedded controller 230) attempts to read from sub-element 448 which is not owned by host 214 (or embedded controller 230, respectively), chip 200 executes a normal read transaction and returns actual read data.

In the case in which both host bus 213 and controller bus 229 own a sub-element, both can write to the sub-element (and not only to the module) concurrently. If the sub-element is locked, neither host 214 nor embedded controller 230 can write to it and data written to it is ignored. In such case, in certain embodiments, no error indication response is made to host 214 and/or embedded controller 230.

Figure 1:
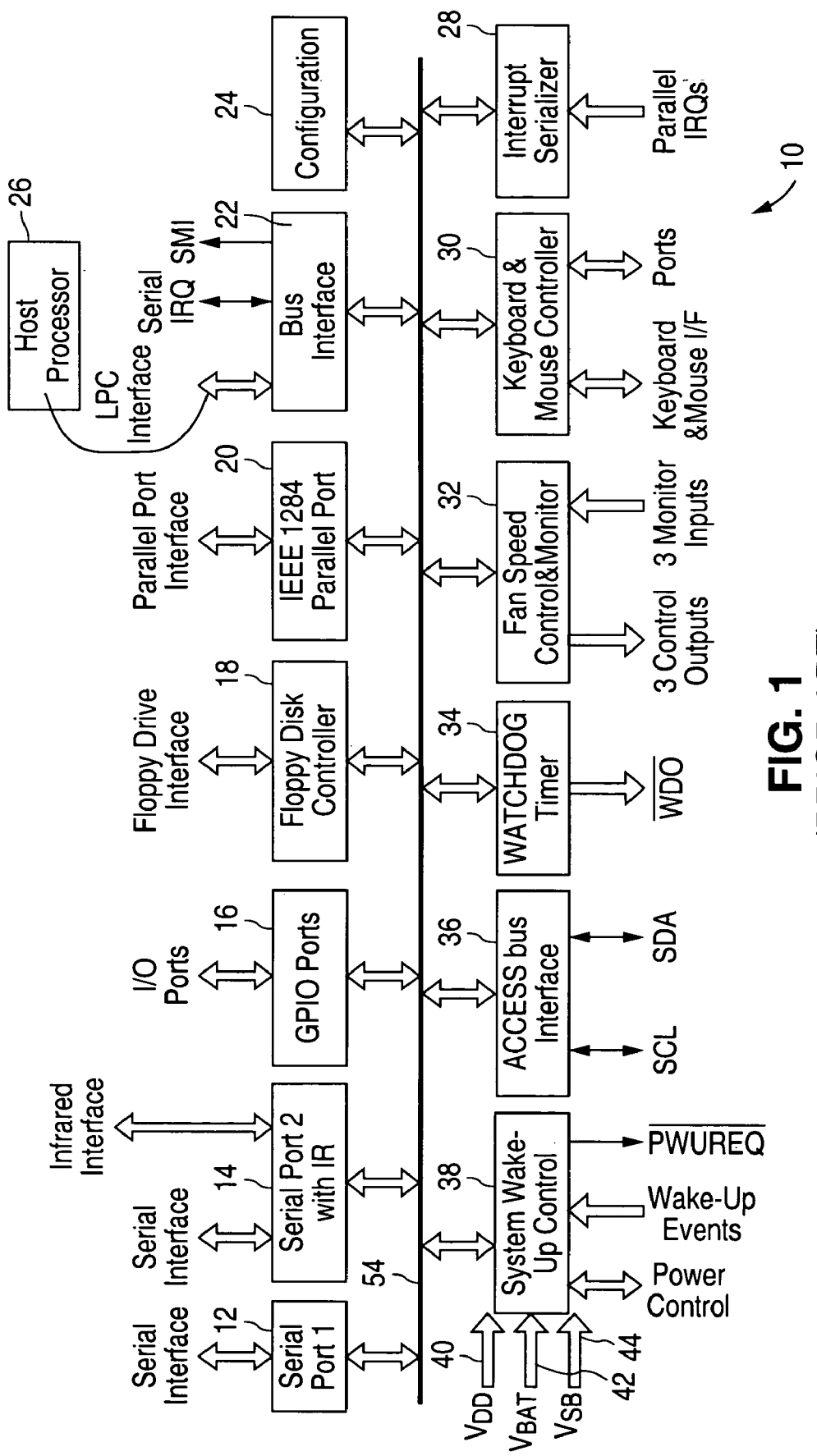
FIG. 1 is a block diagram of a prior art input/output chip (PC87364)
Figure 2:
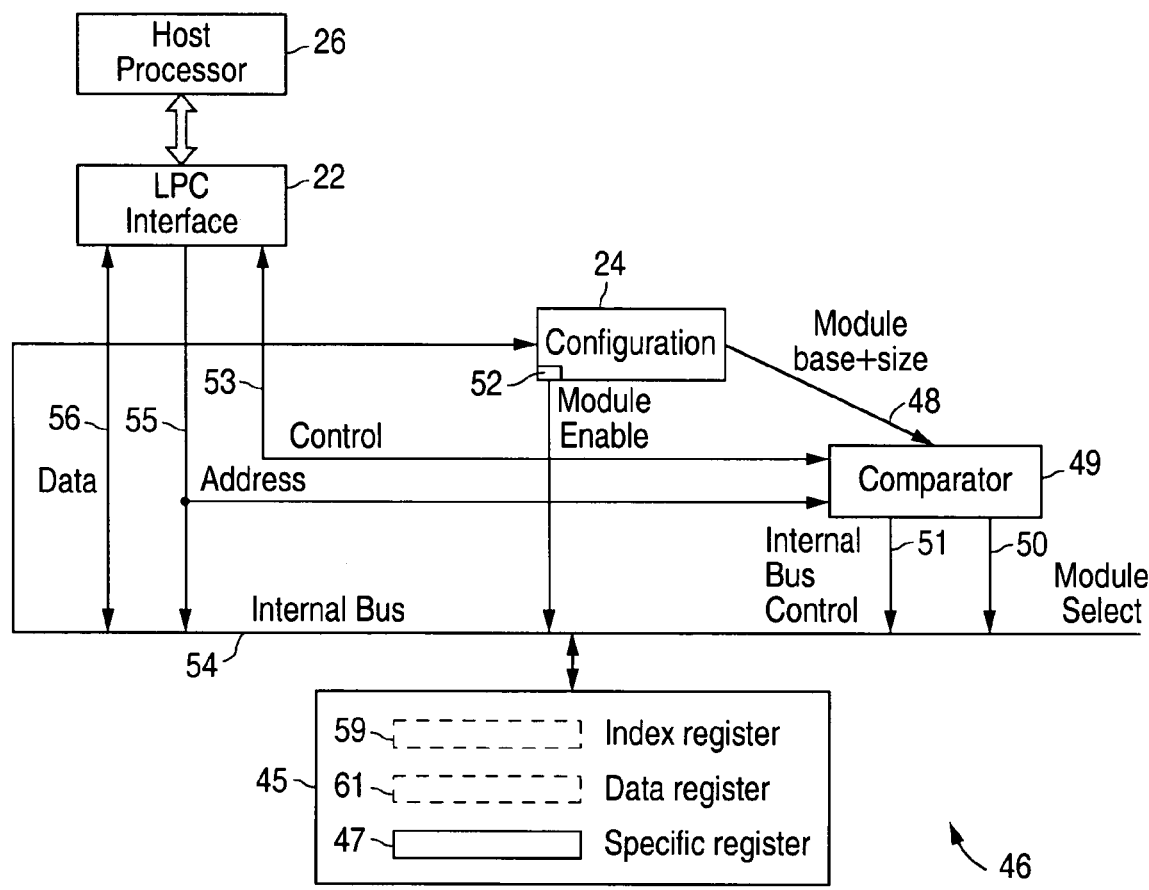
FIG. 2 shows a prior art system for a host processor accessing a module.
Figure 3:
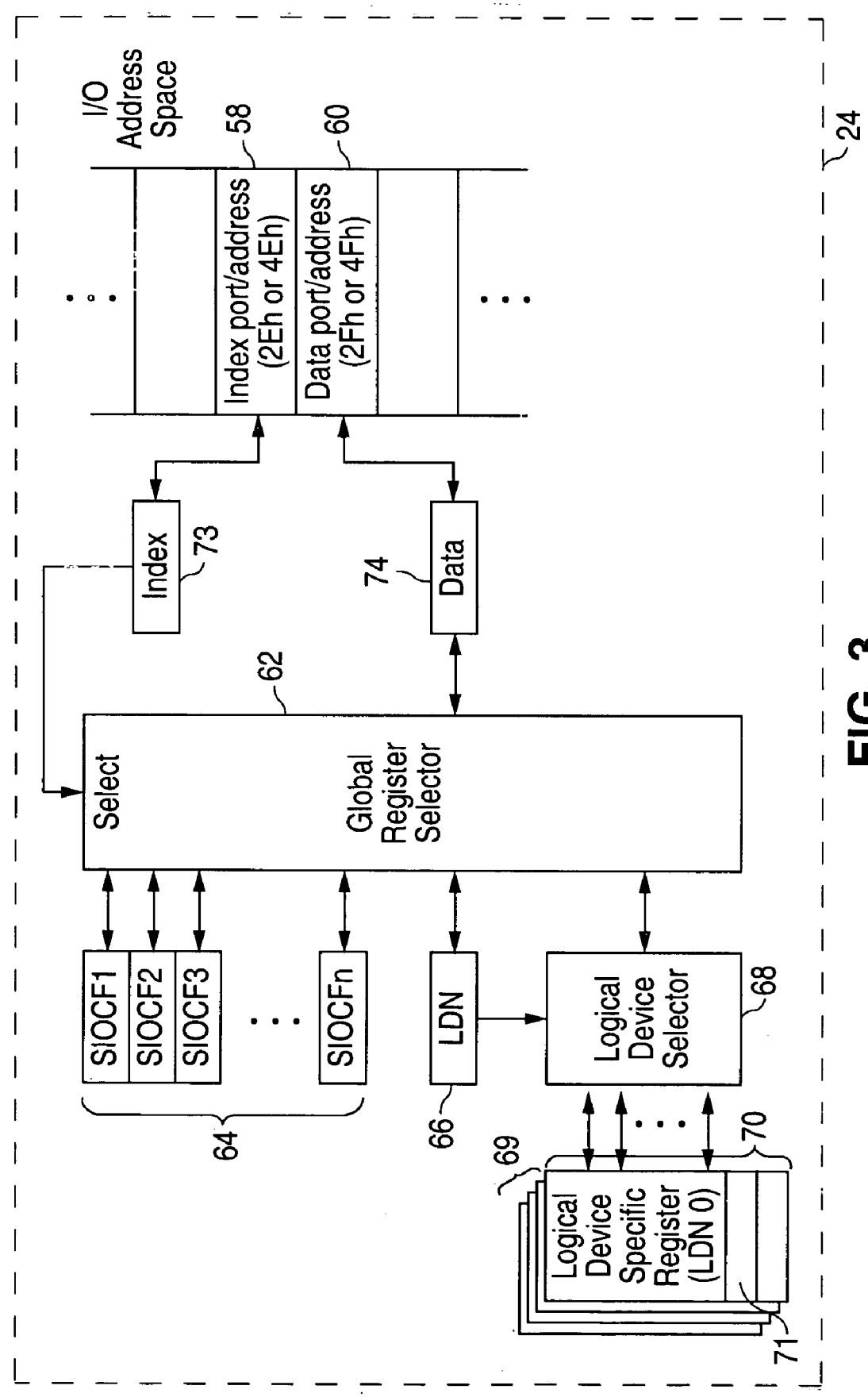
FIG. 3 shows a prior art mechanism for setting module configuration.
Figures 4, 5:
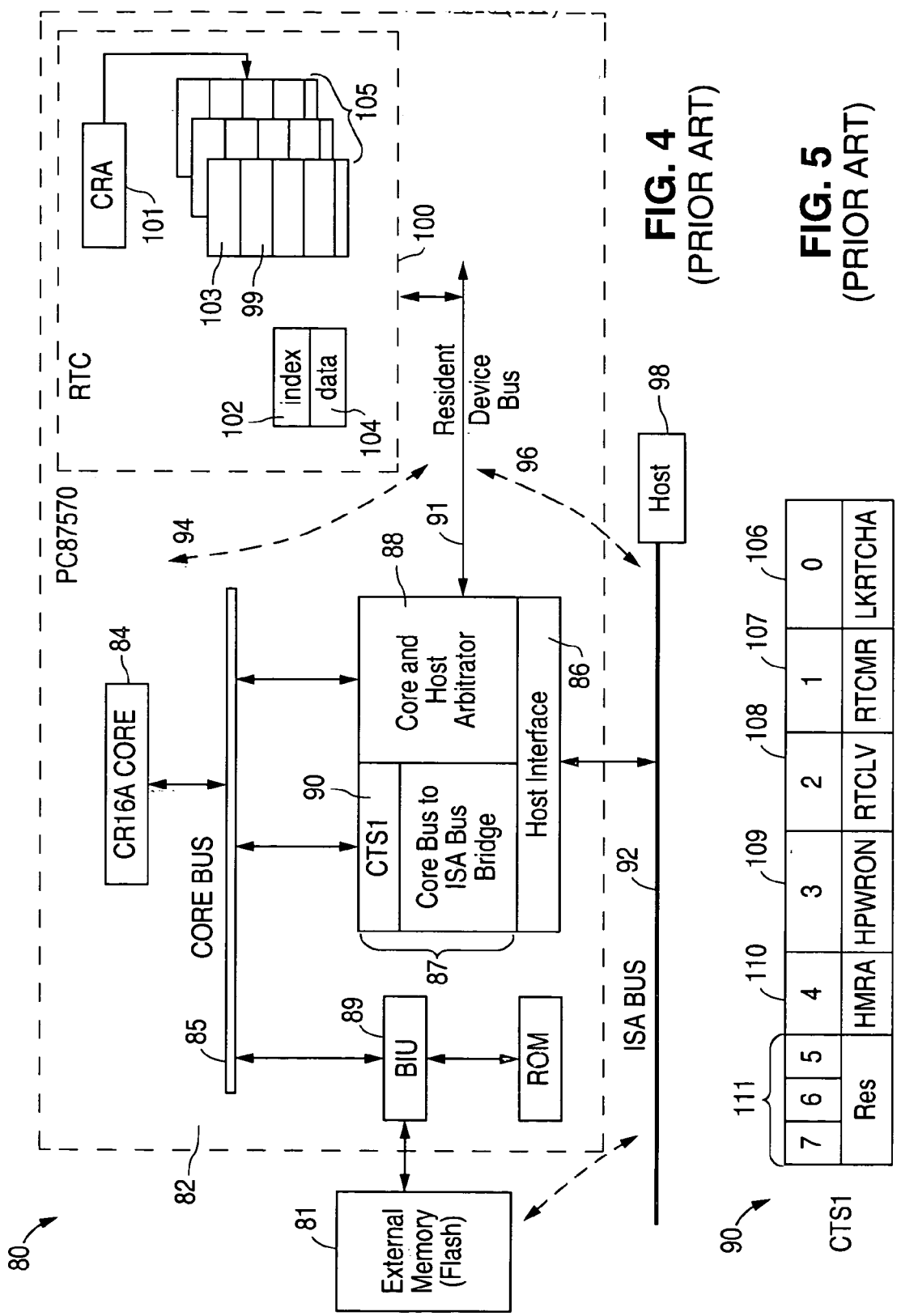
FIG. 4 is a schematic diagram of a prior art keyboard and power management controller chip (PC87570)
FIG. 5 shows a prior art register accessed by a core and used to control host access to an RTC module.
Figure 6:
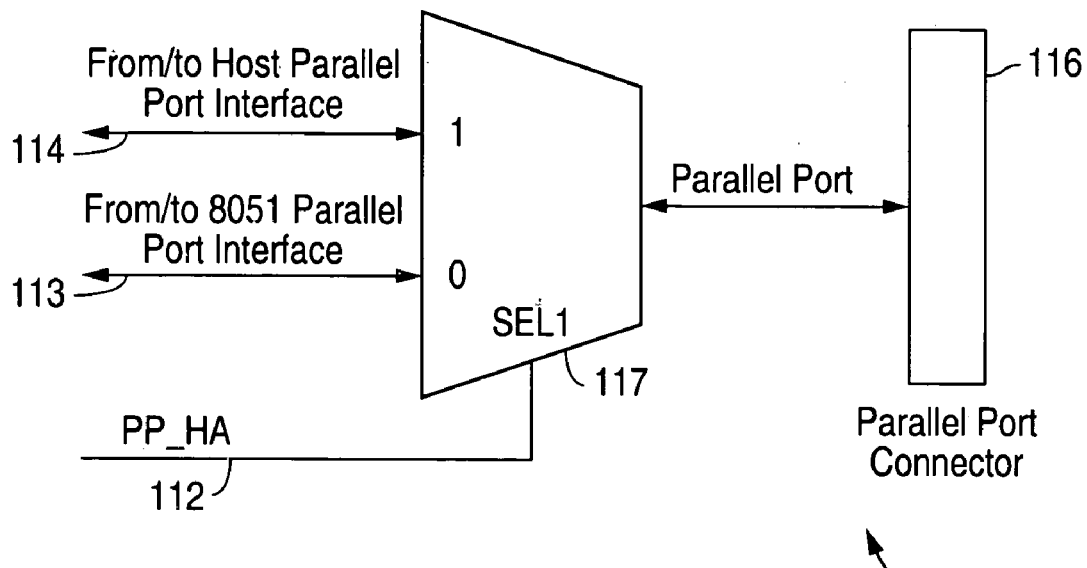
FIG. 6 is a prior art block diagram of a parallel port multiplexer (FDC37N972)
Figure 7:
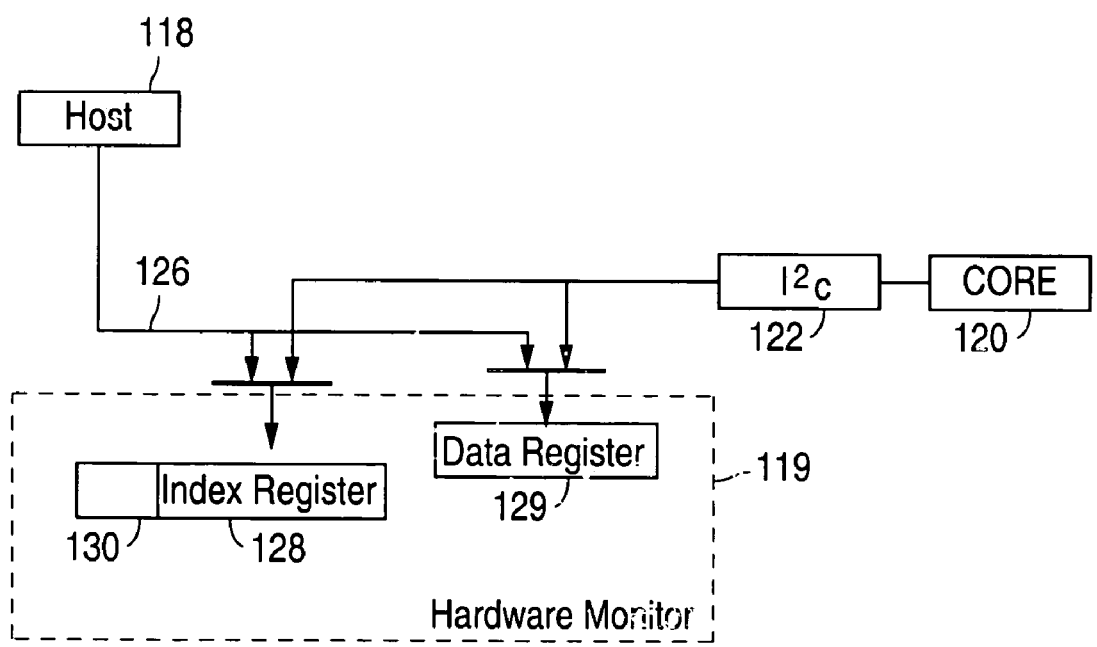
FIG. 7 shows a prior art access scheme to a hardware monitor (W83627HF)
Figure 8:
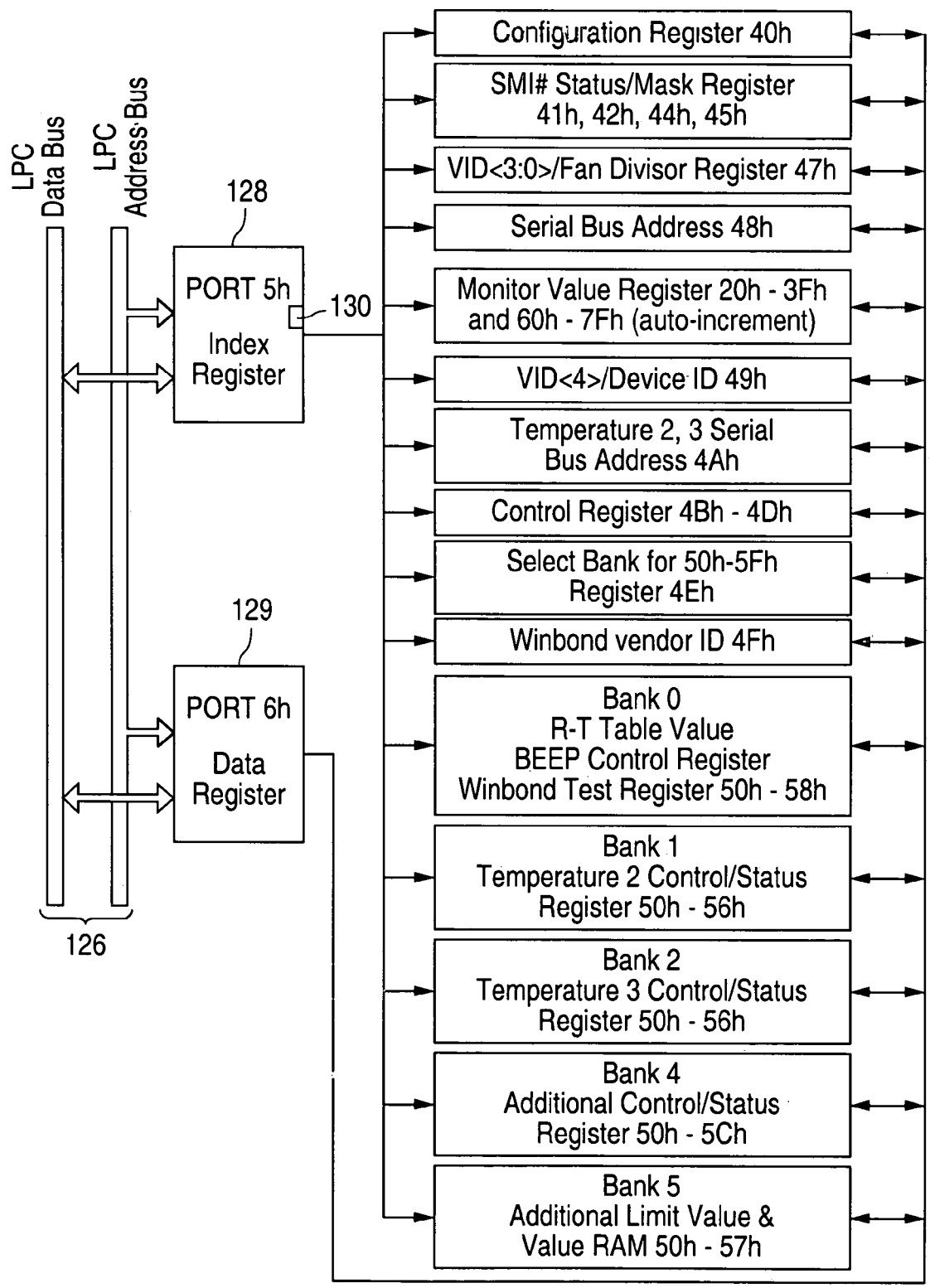
FIG. 8 is a block diagram of the prior art access scheme of FIG. 7 through an LPC bus.
Figure 23:
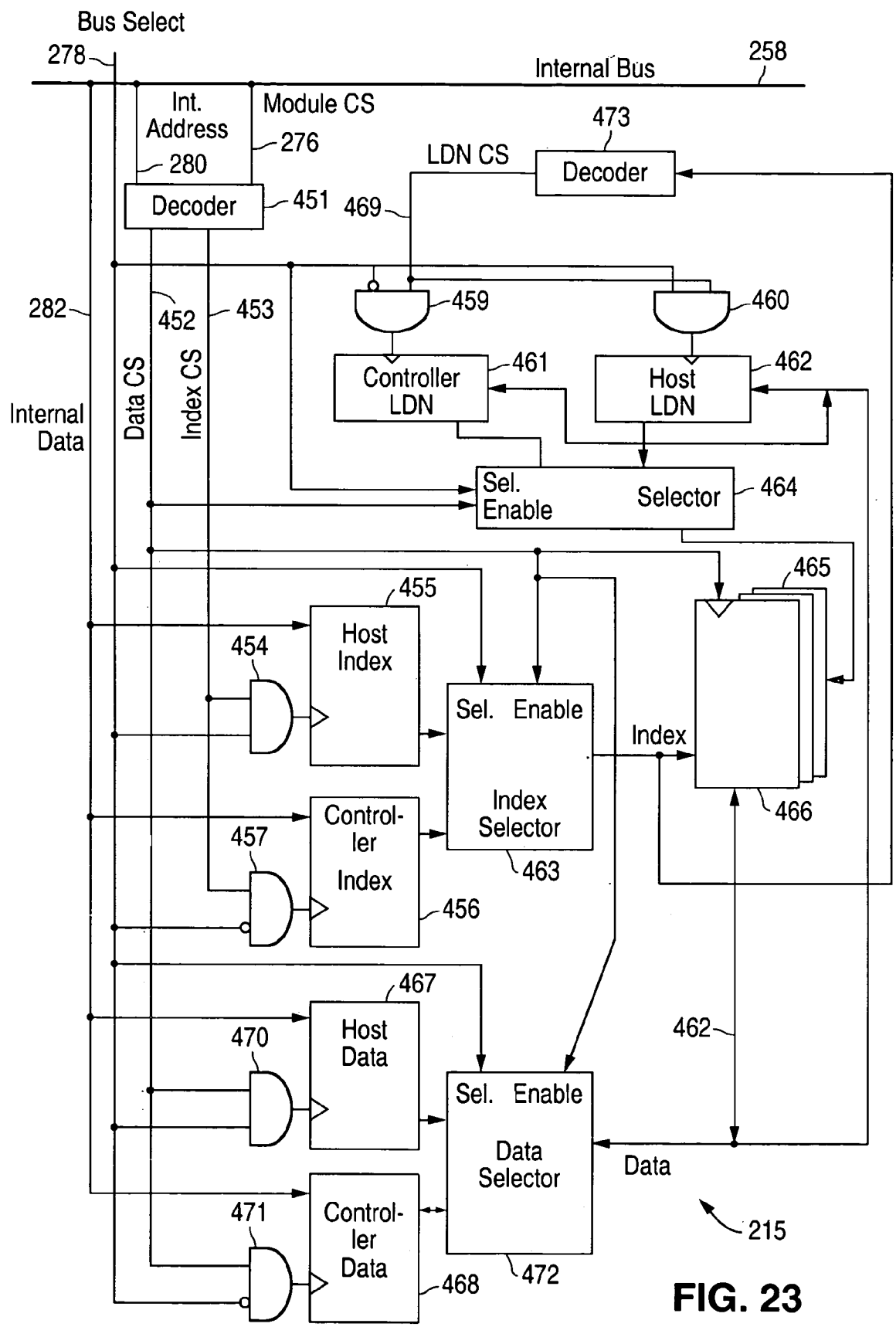
FIG. 23 shows a second concurrent access scheme according to an embodiment of the present invention.

FIG. 23 shows a concurrent access scheme, according to a preferred embodiment, which can be used for certain modules 241 or configuration module 215 whose internal data registers 466 are organized in banks 465 and accessible through index registers. FIG. 23 illustrates the scheme by way of a non-limiting example for device configuration module 215. Configuration module 215 is accessible via internal bus 258. Both embedded controller 230 and host processor 214 can therefore access configuration module 215. Note that configuration module 215 of FIG. 23 is similar to prior art configuration module 24 of FIG. 3, except that the index and bank select (here logical device number) registers are duplicated to enable concurrent access to configuration registers 466 from both host bus 213 and embedded controller bus 229, without disturbing each other. Double data registers 467 and 468 and associated circuitry 472, 470 and 471 are shown in FIG. 23. However as is well known in the art data registers 467 and 468 are dummy registers and they are shown here along with associated circuitry 472, 470 and 471 for ease of understanding. only aspects of FIG. 23 that differ from prior art FIG. 3 are discussed below.

A host configuration index register 455 is written to, A provided bus select 278 is one ("1") configuration module 215 has been selected by module chip select 276 and offset address 280 is that of host configuration index register 455 (i.e., index chip select 453 is generated by decoder 451). Similarly, an embedded controller configuration index register 456 is written to if bus select 278 is zero ("0"), configuration module 215 has been selected by module chip select 276, and offset address 280 is that of controller configuration index register 456 (i.e., index chip select 453 is generated by decoder 451). Gates 454 and 457 are examples of access control circuitry as gates 454 and 457 regulate access to index registers 455 and 456 respectively, only allowing host 214 to write-access the contents of index register 455 and embedded controller 230 to write access the contents of index register 456.

If data 282 written to host index register 455 (i.e., stored) is the index value of a host LDN register 462 (i.e., data=7) the index for host accesses is now set to point to LDN register 462. Then when bus select is one ("1"), configuration module 215 has been selected by chip select 276, and offset address 280 is of configuration host data register 467 (i.e., data chip select 452 is generated by decoder 451), multi-signal switches 472 and 463 direct data 282 (in this case the data is actually the host logical device number) to host LDN register 462. Host LDN register 462 then stores the host logical device number of one of modules 241 to indicate a bank 465. A similar scheme occurs if bus select 278 is zero ("0") causing controller LDN register 461 to store the controller logical device number of one of modules 241 to indicate a bank 465. Gates 460 and 459 are additional examples of access control circuitry as gates 460 and 459 regulate access to LDN registers 462 and 461 respectively, only allowing host 214 to write access the contents of LDN register 462 and embedded controller 230 to write access the contents of LDN register 461.

If the index value (data 282) written to (i.e., stored in) host index register 455 is not that of host LDN register 462, then when bus select 278 is one ("1"), configuration module 215 has been selected by chip select 276, and offset address 280 indicates host data register 467 (i.e., data chip select 452 is generated by decoder 451), multi-signal switches 472, 463 and 464 allow data 282 to be written to or read from internal register 466 matching the index in index register 455, and matching bank 465 indicated by host LDN register 462. Thus, using both index register 455 and LDN register 462, two dimensional indexing is performed. A similar scenario results for the case that bus select 278 is zero ("0"). Based on the contents of controller index register 456 and a controller LDN register 461, internal register 466 in bank 465 is written to or read from.

Multi-signal switches 463 and 464 are additional examples of an access control circuitry as switches 463 and 464 regulate access by controller index registers 455 and 456, and by LDN registers 462 and 461 respectively to an internal register 466 and bank 465 of registers, respectively. Multi-signal switch 463 regulates access by host 214 or embedded controller 230 to particular internal register 466 corresponding to the index value stored in host index register 455 or controller index register 456, respectively. Similarly, multi-signal switch 464 regulates access by host 214 or embedded controller 230 to particular bank 465 indicated by the contents of host LDN register 462 or controller LDN register 461, respectively.

Usage of dual index (455 and 456) and LDN registers (462 and 461) avoids the problem mentioned in the prior art (see above discussion on chip 82) of one processor writing data to or reading data from a different internal register 466 than intended, due to a second processor overwriting the offset index of the intended register 466 contained in the index register with the index value of another register prior to the accessing of the data in intended register 466, without completely blocking access to module 215 or 241 by the other processor. In the embodiment of FIG. 23, each processor has its own indexing and LDN registers, so one processor does not overwrite the index value or LDN number contained in the other processor's index or LDN register. However, if both embedded controller 230 and host 214 are attempting concurrent read/modify and/or write transactions to an internal register at the exact same address (i.e., same index in same bank), the scheme of FIG. 23 is not sufficient to prevent conflict (i.e., one processor will overwrite the contents of internal register 466). In such a case, access by either embedded controller 230 or host 214 needs to be (temporarily) prohibited (for example through the blocked access scheme shown in FIG. 13 and/or FIG. 18).

Figure 24:
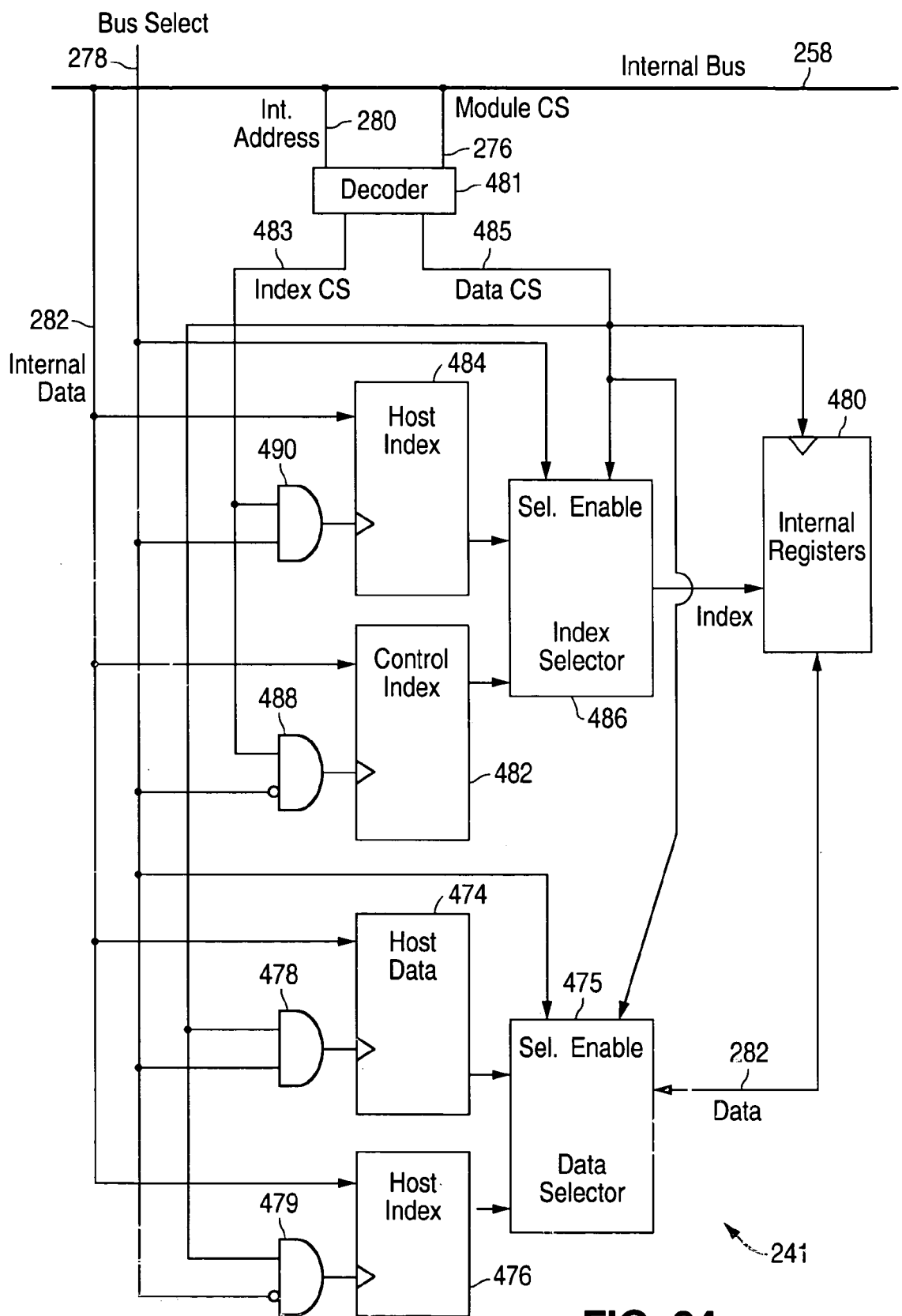
FIG. 24 shows a third concurrent access scheme according to an embodiment of the present invention.

FIG. 24 shows an advantageous embodiment similar to FIG. 23 but for modules 241, or configuration module 215 whose internal data registers 480 are not banked, and therefore dual indexing (and bank select registers) are not required. By way of a non-limiting example, FIG. 24 is assumed to represent a certain module 241. When bus select 278 indicates that internal address 280 (of host index register 484) originated from host bus 213, and that module 241 has been selected (by module chip select 276), an index chip select 483 is generated by decoder 481 and data 282 (representing the index of internal register 480) is written to and stored in host index register 484. If the origination is from controller bus 229, data 282 (representing the index of internal register 480) is instead written to and stored in a controller index register 482.

When internal address 280 is of a host data register 474, in bus select 278 indicates that data 282 originated from host bus 213, and module 241 has been selected (by module chip select 276), a data chip select signal 485 is generated by decoder 481 and the index contained in host index register 484 is selected by a multi-signal switch 486 to write or read data 282 to or from correct internal register 480. Similarly, when internal address 280 is of a controller data register 476, bus select 278 indicates that data 282 originated from controller bus 229, and that module 241 has been selected (by module chip select 276), a data chip select signal 485 is generated by decoder 481 and the index held in controller index register 482 is selected by multi-signal switch 486 to write or read data 282 to or from correct internal register 480. Logic circuits 478, 479, 488 and 490 assume bus select equals zero ("0") for controller bus 229 and one ("1") for host bus 213. Gates 490 and 488 are examples of access control circuitry as gates 490 and 488 regulate access to index registers 484 and 482 respectively, only allowing host 214 to write-access the contents of index register 484 and embedded controller 230 to write access the contents of index register 482. Multi-signal switch 486 is an additional example of access control circuitry. Multi-signal switch 486 regulates access by host 214 or embedded controller 230 to particular internal register 480 corresponding to the index value stored in host index register 484 or controller index register 482, respectively. Similarly to the case in FIG. 23, the scheme of FIG. 24 works well except if both controller bus 229 and host bus 213 want to write or modify register 480 located at the same index. In such a case, access by either embedded controller 230 or host 214 needs to be (temporarily) prohibited (for example through the blocked access scheme shown in FIG. 13 and/or FIG. 18).

As was previously explained, embedded controller 230 uses a serial bus or a parallel bus to access chip 198 or chip 200. In an advantageous embodiment of the present invention, in order for embedded controller 230 to communicate with chip 198 or chip 200, a certain protocol for a serial interface is used based on five byte types shown in FIGS. 25A–25E. Although the protocol is described with respect to embedded controller 230 (the "master") accessing chip 198 or chip 200 (the "slave"), it should be evident that the protocol could be used for any master to access any slave, provided the system including the master and slave support the protocol.

The protocol described below allows embedded controller 230 to access more than one module 241, 215 or 310 because the protocol supports the specification by embedded controller 230 of a logical device number or external chip select.

FIG. 25A shows the slave address byte type 500. Bits 1–7 502 indicate the slave address of the accessed device (in our example the address of chip 198 or chip 200). A bit ACBRW 504 indicates the transfer direction for the current transaction with a zero ("0") value representing a write transaction from master to slave. A one ("1") value for bit 504 represents a read ransaction from slave to master.

FIG. 25B shows two versions of command byte types 506 and 508, differentiated by a INEX bit 510. If bit 510 has a value of zero ("0") then the access type is indicated as internal (i.e., to one of modules 241, controller bus configuration 248 or device configuration module 215 affiliated with the accessed device), and byte type 506 is used. Byte type 506 also includes an RDWR bit 512 which indicates the access direction with zero ("0") meaning write access with data sent by the master written to the selected address. A one ("1"), on the other hand means a read access with data read from the selected address, stored in a temporary read buffer in a controller interface 246. Byte 506 also includes six bits 514 for indicating the controller logical device number of internal module 241, 248, or 215.

If bit 510 is set at one ("1"), access is indicated as external (i.e., to one of external modules 310 affiliated with the accessed device and connected to bus extension 226), and byte type 508 is used. Byte type 508 includes RDWR bit 512, two bits 516 for indicating one of four extension bus chip selects 316 (see FIG. 17) corresponding to bus extension 226, three bits 518 for indicating the most significant bits of the bus extension offset address 280 (location), and one reserved bit 520.

FIG. 25C shows an offset address byte type 522, indicating location. For internal access, byte 522 includes the offset address from the base of the functional block (241, 248, or 215). For external access, byte 522 includes eight bits of the offset address from the base of extension bus chip select 316. Note that the offset address for an external access consists of twenty seven (27) bits in total with three (3) bits defined by bits 518 of command byte 508. Therefore three (3) offset address bytes 522 are used to define the other twenty four (24) bits of the address. The large addresses allowed for an external access allows flexibility in the type of modules 310, including memory, that can be attached to bus extension 226.

FIG. 25D shows a data byte type 524 representing either written or read data.

FIG. 25E shows an optional Packet Error Check (PEC) byte type 526 (defined by SMBus Rev 1.1 Dec. 11, 1998) which represents the eight (8) bit cyclic redundancy check of all transferred bytes. Byte 526 is attached at the end of a transaction as the last byte before a stop condition, if PEC is supported by a specific embodiment, i.e., by the master.

It will now be explained how in an advantageous embodiment the master writes or reads data from the slave, using bytes 500, 506 or 508, 522, 524, and 526.

Figure 26A:
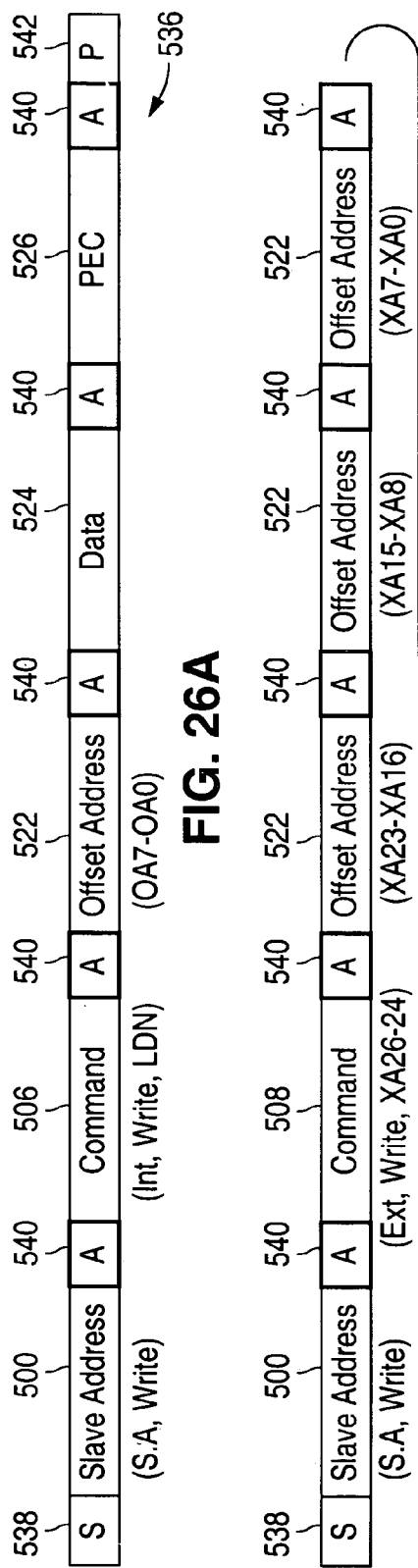
FIG. 26A shows an internal write transaction according to an embodiment of the present invention.

Refer to an advantageous embodiment illustrated in FIG. 26A. To write an internal transaction 536, the master sets a start condition 538, and transmits slave address byte 500. The master then waits for an acknowledgment (ACK) 540 from the slave before proceeding with the transmission of command byte 506. Again, the master waits for ACK 540. If the indicated controller logical device number is not powered (for example $V_{DD}$ 234 off for selected $V_{DD}$ powered module 240 or for the parts of configuration module 215 powered by $V_{DD}$ 234) the slave instead issues a non-acknowledgement (NACK) indication at the end of command byte 506 and the transaction is aborted. If the transaction is not aborted, the master next transmits offset address 522, and waits for ACK 540 before transmitting data byte 524. Again, the master waits for ACK 540. If supported by the master sends PEC byte 526 and once the final ACK 540 is received sets a stop condition 542.

Note that the issuance of a NACK indication by the slave and the aborting of the transaction if a module is not powered, is an example of a way of preventing access to a non-powered module. As previously mentioned, preventing access to modules powered by $V_{DD}$ 234 when $V_{DD}$ 234 is off is especially important in embodiments where internal bus 258 is powered by both $V_{DD}$ 234 and $V_{SB}$ 238.

Figure 26B:
FIG. 26B shows an external write transaction according to an embodiment of the present invention.

FIG. 26B shows a write external transaction 550, according to an advantageous embodiment. Transaction 550 is similar to write internal transaction 536 other than for three offset address bytes 522 which are sent in the place of one, and for command byte 508 instead of 506. The reasons for these differences were discussed above and will not be further elaborated on.

Figure 26C:
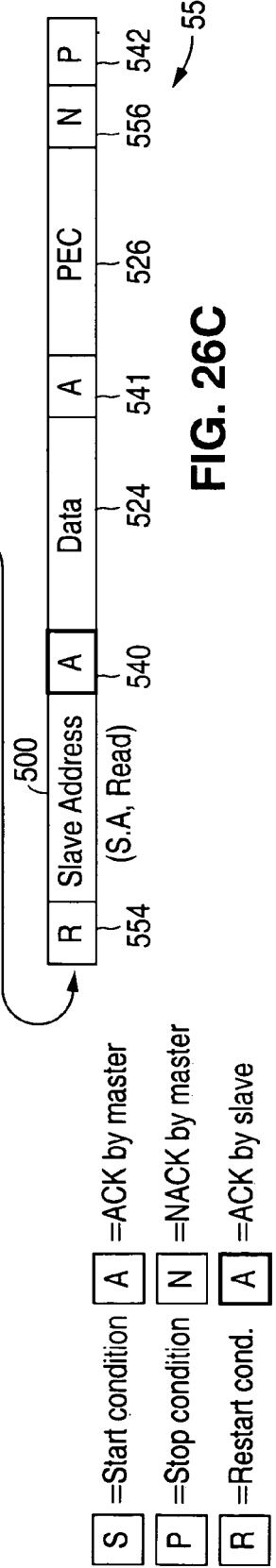
FIG. 26C shows an internal read transaction according to an embodiment of the present invention.

FIG. 26C shows a read internal transaction 552, according to an advantageous embodiment. As traffic can only go in one direction (i.e., from master to slave or vice versa) at a time, read transaction 552 is divided into two phases. In the first phase, the master sends address byte 500 of the slave indicating a master to slave transfer direction. Once the slave sends ACK 540, the master sends read command 506 indicating that data from the selected address should be stored in a read buffer. Following ACK 540 from the slave, offset address byte 522 (which together with controller LDN bits 514 already included in command byte 506 indicate the selected address) is transmitted. Once the slave sends ACK 540, the master sends a restart condition 554 to begin the second phase. Restart condition 554 is similar to start condition 538 but restart condition 554 is sent in the middle of a transaction, without giving up the bus ownership. There is no stop condition 542 after the first phase.

In the second phase, the master again send address byte 500 of the slave, this time indicating a slave to master transfer direction. The slave sends ACK 540 and then the slave transfers data byte 524 from the read buffer to the master. Once the master sends an ACK bit 541, PEC byte 526 is sent by the slave, if required by the master. PEC byte 526 is based on the bytes transferred during both phases. The transaction is completed by the master sending a NACK 556 and by stop condition 542.

If the indicated controller logical device number is not powered (for example $V_{DD}$ 234 off for selected module 240), the slave issues a non-acknowledgement (NACK) at the end of command byte 506 and the transaction is aborted. The importance of aborting such a transaction was discussed with reference to FIG. 26A.

FIG. 26D shows a read external transaction 560, according to an advantageous embodiment. Transaction 560 is similar to read internal transaction 552, other than that command 508 replaces command 506 and that three offset bytes 522 are transmitted instead of one.

Note that if the internal registers of the module are accessible through index/data registers, at least two transactions are necessary to read or write (with the possible exception for data accesses to the same index value). The first transaction specifies the offset address of the index register and the data to be placed in the index register (in this case the index value of an internal register), and the second transaction specifies the offset address of the data register and allows the data to be written to the internal register or read from the internal register (via the read buffer as explained above). If the internal registers are banked, using a bank select register, two additional (earlier) transactions may in certain cases be needed to specify the bank: the first to specify the offset address of the index register and the data to be placed in the index register (in this case the data is the index value of the bank register) and the second to specify the offset address of the data register and the data to be placed in the data register and in the bank register (here the data is an indication of the desired bank).

On the other hand, in the general case when the internal registers of a module can be accessed directly (i.e., no index/data registers used), only one transaction is needed to read or write, with the offset address of the internal register specified and the data written to the internal register or read from the internal register (via the read buffer as explained above).

FIG. 26E shows a reset slave transaction 562 which resets the status flags, logic and data (but not configuration) registers in controller interface 228 and reloads the current slave address, according to an advantageous embodiment. Because this is a broadcast transaction, all slave devices connected to the bus (for example, connected to controller bus 229) respond to the broadcast transaction and perform the same reset and reload operation.

Referring to FIG. 17 and FIG. 12, the bus arbitration process according to an advantageous embodiment, performed by bus arbitration module 300 to allow access to internal bus 258 (internal data 282 and internal address 280) will be detailed, assuming a serial interface for embedded controller 230 as per the protocol described above for FIGS. 25–26 and assuming an LPC interface for host 214 whose prior art protocol is defined by Intel's LPC Specification, Revision 1.0.

In general, access to the shared resource of internal bus 258 by a transaction originating from controller bus 229 or host bus 213 is allocated fairly in advantageous embodiments, i.e., the first transaction to arrive is the first to access internal bus 258. For example, a transaction is considered "arrived" for LPC bus when the LFRAME# signal is asserted, for SMBus write when the data is received, and for SMBus read, when the address bytes are received. The exception is, of course, if access to internal bus 258 is blocked as explained above with reference to FIG. 13 and FIG. 18. Once the first transaction is completed (i.e., internal bus 258 is freed up), the next transaction in line accesses internal bus 258, so that interleaving transactions originating from controller bus 229 and host bus 213 is permitted. In the case of LPC and SMBus being used as host bus 213 and controller bus 229 respectively, a gap is generally guaranteed between the transactions of each of the two. This gap guarantees the interleaving of transactions on the "first arrived, first-served" basis. If the bus protocols used may instead generate transactions that are back to back, a mechanism that guarantees a "fair" allocation of the internal bus usage may need to be added. The timing of address offsets 280 and data 282 for consecutive transactions being placed on internal bus 258 are shown in FIGS. 27–29.

Figure 27:
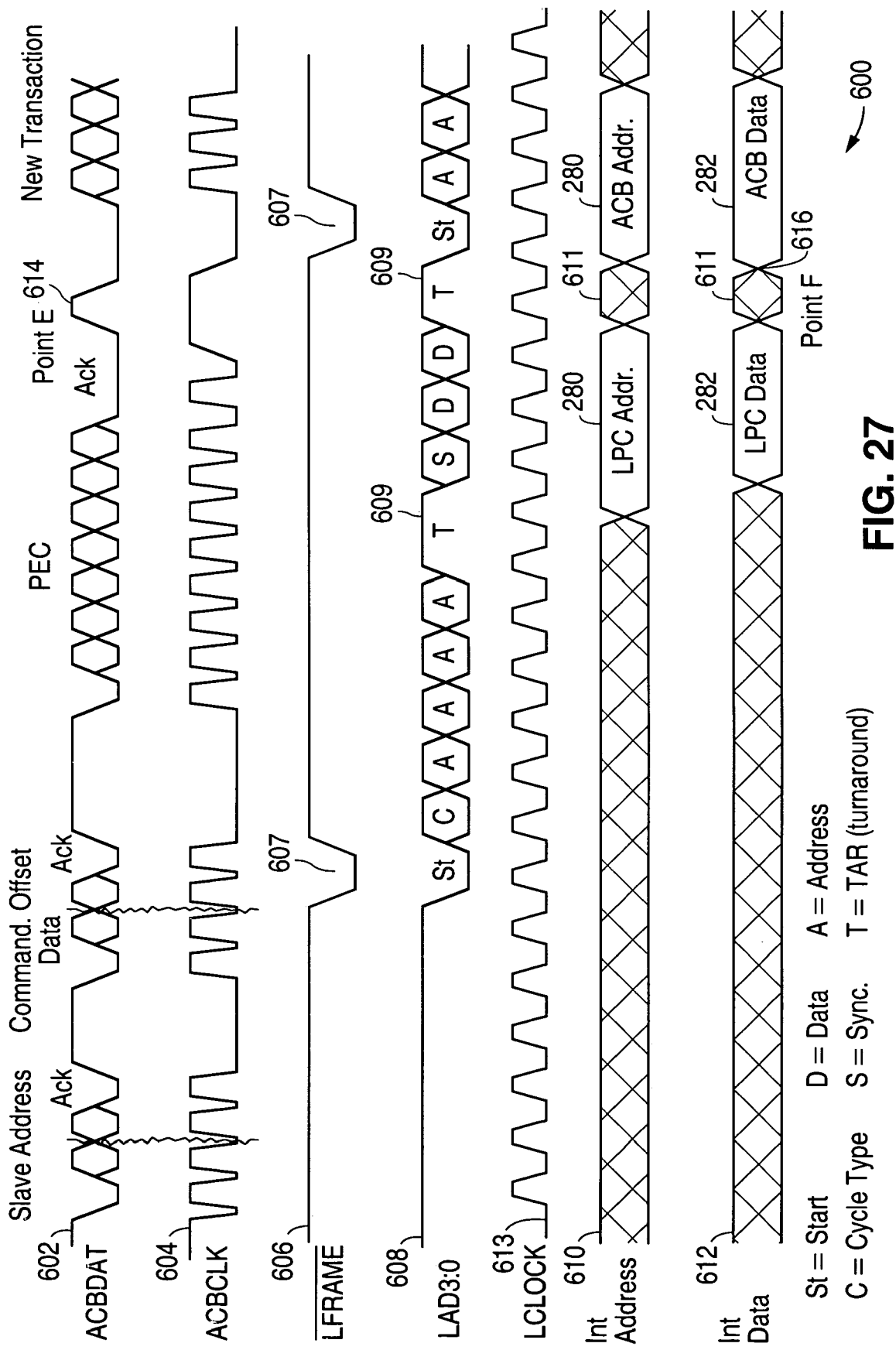
FIG. 27 shows the timing diagrams for a controller write transaction following a host processor transaction according to an embodiment of the present invention.
Figure 28:
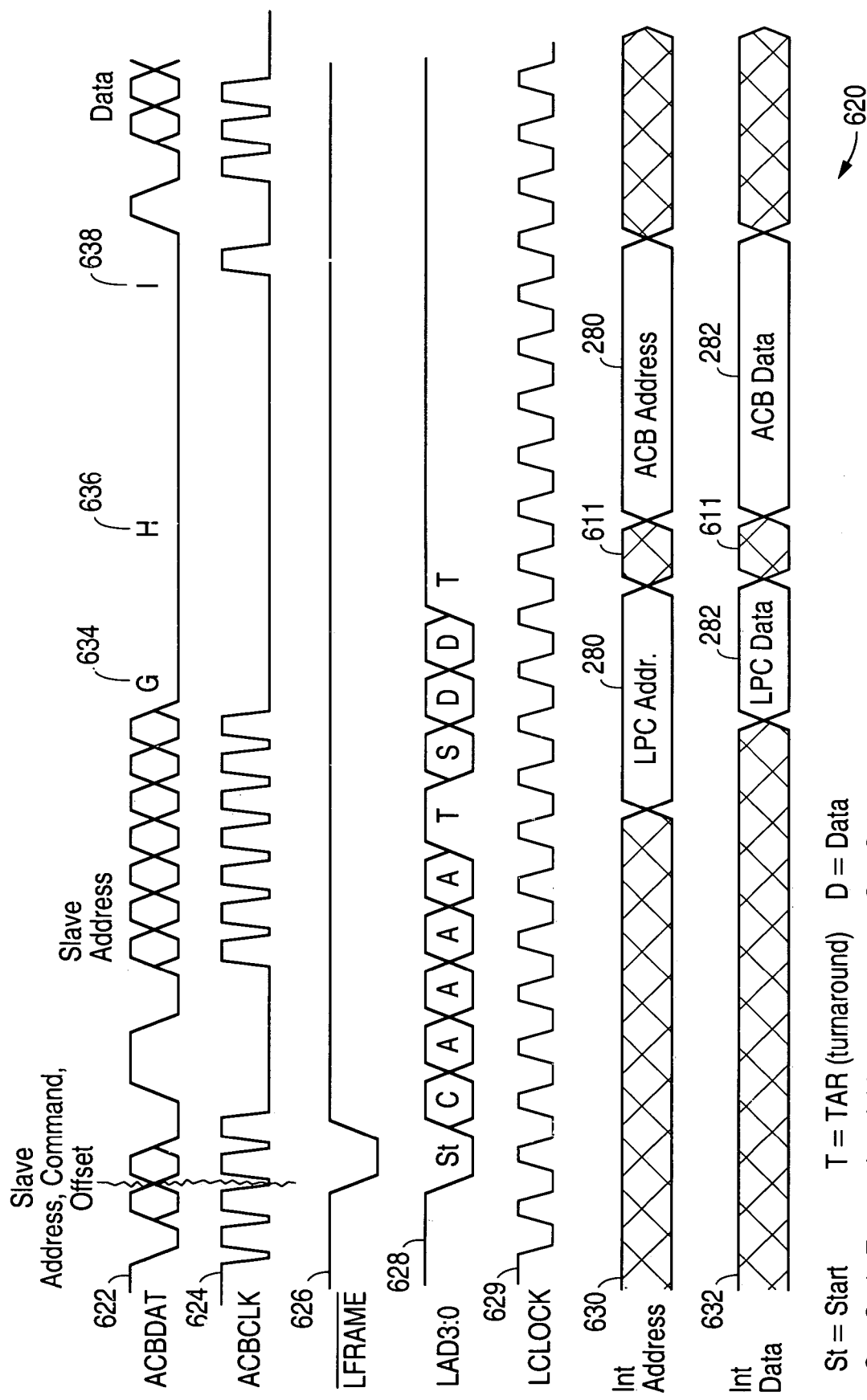
FIG. 28 shows the timing diagrams for a controller read transaction following a host processor transaction according to an embodiment of the present invention.
Figure 29:
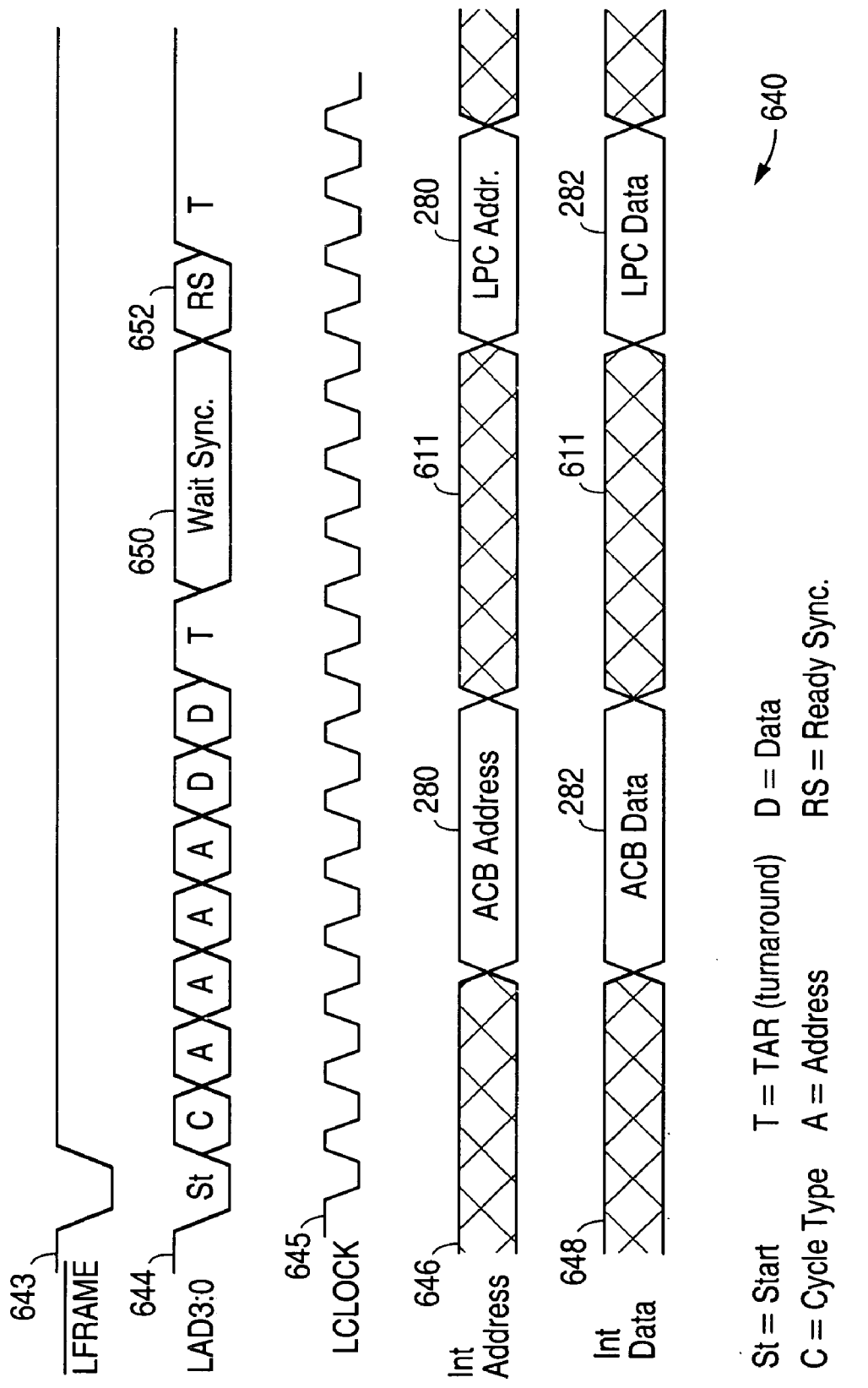
FIG. 29 shows the timing diagrams for a host processor transaction following a controller transaction according to an embodiment of the present invention.

FIGS. 27–29 are not drawn to scale. Generally, a controller transaction is about one thousand times (1000×) longer than a host transaction.

FIG. 27 shows the timing diagram 600 for a controller bus write transaction (as for example in FIG. 26A or FIG. 26B) which is delayed until the end of a host transaction, according to an advantageous embodiment. An ACBDAT 602 timing diagram for controller 230 shows the timing of the bytes of a write transaction (for example, transactions 536 or 550 of FIG. 26A or FIG. 26B) on controller bus 229. An ACBCLK 604 timing diagram shows the timing of the clock of controller 230. A high to low transition of ACBDAT 602 while ACBCLK 604 is high indicates start condition 538. A low to high transition of ACBDAT 602 while ACBCLK 604 is high indicates stop condition 542. Point E 614 indicates the completion of a first controller transaction and the start of a new transaction on controller bus 229.

An LFRAME# timing diagram 606 shows the beginning of each new host transaction (see cycles 607)

An LAD3:0 608 timing diagram shows the transaction on host bus 213 (according to prior art host protocol). The host transaction is first allowed control of internal bus 258 because the host transaction arrived before the controller transaction, and address offsets 280 and data 282 originating from host 213 are placed on internal bus 258. An internal address 610 timing diagram represents address offset 280 and an internal data 612 timing diagram represents data 282. The host transaction is a read transaction so a turnaround 609 is sent to reverse direction of LAD3:0 608. A point F 616 represents the time where the controller transaction gains control of internal bus 258. The time between point E 614 and point F 616 represents the time from when the first controller transaction is completed on controller bus 229 to when the controller transaction gains access to internal bus 258—i.e., the waiting time for internal bus 258 by the first controller bus transaction. The gap 611 between the host transaction and the controller transaction through internal bus 258 is required for bus arbitrator synchronization.

FIG. 28 shows a timing diagram 620 for a controller bus read transaction (for example, as in FIG. 26C or FIG. 26D) which is delayed until the end of a host transaction, according to an advantageous embodiment. The differences between timing diagram 620 and timing diagram 600 relate to the bi-direction of a read transaction. Controller interface 246 can not continue the current transaction and transfer the read data to master embedded controller 230 until the read data is read and transferred through internal bus 258. Therefore the controller clock shown in a timing diagram ACBCLK 624 is stopped until the requested data is available to be sent to controller bus 229 at point I 638. The time between a point G 634 (address offset of the transaction from controller bus 229 ready to load unto internal bus 258) and a point H 636 (internal bus 258 free) represents the waiting period for gaining access to internal bus 258, while the time between point G 634 and point I 638 (requested data 282 of first transaction ready to be loaded onto controller bus 229) represents the time the controller clock is held low, to extend the current transaction.

FIG. 29 shows the timing diagram 640 for a host 214 write transaction delayed until the end of an embedded controller 230 transaction, according to an advantageous embodiment. An LAD3:0 644 host bus timing diagram shows a wait sync 650 received from chip 198 or chip 200 during the time that host 213 must wait for internal bus 258 to be free. A ready sync 652 from chip 198 or chip 200 indicates that internal bus 258 is free. A host read transaction is similar to FIG. 29, except that host data 648 begins on internal bus 258 only after ready sync 652.

In certain embodiments, the clock used on internal bus 258 and/or modules 241, module 215 and/or modules 310 through bus extension 226 for processing transactions originating from controller bus 229 is asynchronous to (i.e., differs from) the clock used on internal bus 258 and/or modules 241, module 215 and/or modules 310 through bus extension 226 for transactions originating from host bus 213, thereby allowing increased throughput to modules 241, module 215 and/or modules 310 than if the clocks were synchronous. (Synchronous clocks would imply fixed clock(s) for internal bus 258 and/or modules 241, module 215 and/or modules 310 through bus extension 226, independent of which processor 214 or 230 originated the transaction). Note that in FIG. 27 and FIG. 28, a clock is shown for controller bus 229 (ACBCLK 604 and ACBCLK 624 respectively) and for host bus 229 (LCLOCK 613 and LCLOCK 629 respectively) but no clock is shown for internal bus 258 because in certain embodiments, internal bus 258 may be an asynchronous bus. Preferably, the clock for the elements without a fixed clock (for example, internal bus 258 and/or modules 241, module 215 and/or modules 310 through bus extension 226) is synchronized to the clock of the processor (either host 214 or embedded controller 230) which originated the transaction.

While the invention has been described with respect to a limited number of embodiments, it will be appreciated that many variations, modifications and other applications of the invention may be made.

What is claimed is:

1. A system for allowing shared access by at least two processors including an embedded controller and a host processor to at least two modules, comprising:
   a transaction control, wherein the embedded controller is capable of providing an indication of which of the modules to access to the transaction control, and wherein the host processor is capable of providing an indication of which of the modules to access to the transaction control; and
   at least one access block bit controlled by one of the processors for blocking access by another of the processors to at least one of the modules, wherein the at least one access block bit is capable of enabling at least one of the modules, wherein enabling would activate said at least one of the modules.

2. The system of claim 1, further comprising a bus extension;
   wherein at least one of the modules is accessible via said bus extension;
   wherein said transaction control is capable of providing to said bus extension an indication of said at least one of the modules, accessible via said bus extension, for access by the host processor;
   wherein said transaction control is capable of providing to said bus extension an indication of said at least one of the modules, accessible via said bus extension, for access by the embedded controller; and
   wherein said bus extension is capable of providing an indication of said at least one of the modules for access by one of the processors.

3. The system of claim 1, wherein said transaction control is capable of providing an indication of at least one of the modules for access by one of the processors.

4. The system of claim 1, wherein at least one of the modules is part of an input/output chip.

5. A method for allowing shared access to at least two modules by at least two processors including an embedded controller and a host processor, comprising the steps of:
   receiving an indication from each of the processors of a module from among the at least two modules to access;
   arbitrating between the processors in favor of one of the processors, wherein arbitrating between the processors comprises allowing one of the processors to control at least one access block bit, the at least one access block bit capable of blocking access by another of the processors to at least one of the modules, the at least one access block bit capable of enabling at least one of modules, wherein enabling would activate said at least one of the modules.

6. The method of claim 5, further comprising the step of:
   blocking access by another of the processors to said module indicated by said one of the processors.

7. The method of claim 5, wherein said indication from each of the processors is for a different module to access.

8. A method for allowing a processor comprising an embedded controller to access at least two modules affiliated with a device, comprising the steps of:
   indicating the device;
   indicating an access direction(read/write);
   indicating one of the modules for accessing;
   indicating a location for accessing, within said indicated one of the modules;
   transferring data between said indicated location and the embedded controller; and
   setting at least one access block bit to block access by another processor to at least one of the modules, wherein the at least one access block bit is capable of enabling at least one of the modules, wherein enabling would activate said at least one of the modules.

9. The method of claim 8, wherein said indicated one of the modules is accessible via a bus extension.

10. The method of claim 9, wherein said step of indicating one of the modules for accessing includes the step of:
    indicating one of at least one chip select corresponding to said bus extension for accessing.

11. The method of claim 8, wherein said indicated one of the modules is part of an input/output chip.

12. The method of claim 11, wherein said step of indicating one of the modules for accessing includes the step of:
    indicating a logical device number.

13. The method of claim 8, wherein said step of indicating a location for accessing includes the step of providing an indication of a location for accessing via an internal bus to said indicated one of said modules, the method further comprising the step of:
    waiting for a freeing up of said internal bus before transferring said indication of a location for accessing onto said internal bus.

14. The method of claim 13, wherein said internal bus is occupied by a transaction originating from the other processor prior to said freeing up.

15. The method of claim 8, further comprising the step of:
    the embedded controller waiting for receipt of data from said indicated location prior to initiating a subsequent access.

16. The system of claim 2, wherein at least one of the modules comprises a memory accessible through the bus extension.

17. The method of claim 5, wherein at least one of the modules comprises a memory accessible through a bus extension.

18. The system of claim 1, wherein the transaction control is further capable of allowing concurrent access by the processors to at least one of: one or more of the modules, and one or more sub-modules within at least one of the modules.

19. The system of claim 1, further comprising:
    at least one disable bit controlled by one of the processors, wherein the at least one disable bit is capable of disabling at least one of the modules even if the at least one access block bit is set to enable the at least one module; and
    at least one tri-state bit controlled by one of the processors, wherein the at least one tri-state bit is capable of disabling an output of at least one of the modules even if the at least one access block bit is set to enable the at least one module.

20. The system of claim 1, wherein the at least one access block bit is capable of enabling at least one of the modules by activating the at least one module.

* * * * *